(12) United States Patent
Guiset et al.

(10) Patent No.: US 10,001,591 B2
(45) Date of Patent: Jun. 19, 2018

(54) OPTOMECHANICAL SYSTEM FOR INJECTING LIGHT, OPTICAL COUPLER OF SAID SYSTEM ILLUMINATING DEVICE WITH SAID SYSTEM

(71) Applicants: SAINT-GOBAIN ADFORS, Chambery (FR); SAINT-GOBAIN PLACO, Suresnes (FR)

(72) Inventors: Pierrick Guiset, Massy (FR); Maud Sarrant-Foresti, Paris (FR); Cédric Brochier, Lyons (FR); Delphine Chevalier, Valence (FR)

(73) Assignees: SAINT-GOBAIN ADFORS, Chambery (FR); SAINT-GOBAIN PLACO, Suresnes (FR)

( * ) Notice: Subject to any disclaimer, the term of this patent is extended or adjusted under 35 U.S.C. 154(b) by 0 days. days.

(21) Appl. No.: 14/908,890

(22) PCT Filed: Jul. 29, 2014

(86) PCT No.: PCT/FR2014/051959
§ 371 (c)(1),
(2) Date: Jan. 29, 2016

(87) PCT Pub. No.: WO2015/015110
PCT Pub. Date: Feb. 5, 2015

(65) Prior Publication Data
US 2016/0170121 A1    Jun. 16, 2016

(30) Foreign Application Priority Data

Jul. 29, 2013 (FR) ..................................... 13 57461

(51) Int. Cl.
*F21V 7/04* (2006.01)
*F21V 8/00* (2006.01)
(Continued)

(52) U.S. Cl.
CPC ........... *G02B 6/0006* (2013.01); *G02B 6/001* (2013.01); *G02B 19/0028* (2013.01);
(Continued)

(58) Field of Classification Search
CPC .. G02B 6/0006; G02B 6/001; G02B 19/0028; G02B 19/0047; G02B 6/04; G02B 6/32;
(Continued)

(56) References Cited

U.S. PATENT DOCUMENTS

2006/0044820 A1* 3/2006 Ruffin .................. G02B 6/0006
362/554
2011/0075418 A1* 3/2011 Mallory et al. .... G02B 19/0028
362/326

FOREIGN PATENT DOCUMENTS

FR    2 859 737 A1    3/2005
FR    2 907 194 A1    4/2008
(Continued)

OTHER PUBLICATIONS

International Search Report as issued in International Patent Application No. PCT/FR2014/051959, dated Nov. 13, 2014.

*Primary Examiner* — Y M. Lee
(74) *Attorney, Agent, or Firm* — Pillsbury Winthrop Shaw Pittman LLP

(57) ABSTRACT

A system for injecting light, includes an optical coupler having: a lens having a convex entrance face of radial extent R1, a convex central exit face and a peripheral exit face; a cavity, containing the entrance face and with an entrance lateral surface; and a peripheral reflective surface, encircling the lens and the cavity, extending beyond the entrance face; an optical collector, with an entrance, a collecting surface facing the central exit face, and a numerical aperture NA smaller than 1, the collector including a jacket having an end surface; and a member for aligning the optical collector, the optical coupler and the aligning member being integrally (Continued)

formed or being indirectly or directly fastened together, the central distance eF on the axis Oz between the collecting surface and the central exit face being nonzero and smaller than 5 mm, and the system including a stop for the end surface.

25 Claims, 6 Drawing Sheets

(51) Int. Cl.
  *G02B 19/00* (2006.01)
  *G02B 6/32* (2006.01)
  *G02B 6/04* (2006.01)
(52) U.S. Cl.
  CPC ............ *G02B 19/0047* (2013.01); *G02B 6/04* (2013.01); *G02B 6/32* (2013.01)

(58) Field of Classification Search
  CPC .. G02B 6/0008; G02B 19/0061; G02B 6/322; G02B 6/26; G02B 6/262; G02B 6/4298; G02B 6/42
  See application file for complete search history.

(56) References Cited

FOREIGN PATENT DOCUMENTS

| FR | 2 936 592 A1 | 4/2010 |
|---|---|---|
| FR | 2 938 628 A1 | 5/2010 |
| WO | WO 2005/026423 A2 | 3/2005 |
| WO | WO 2007/003857 A2 | 1/2007 |
| WO | WO 2008/062141 A2 | 5/2008 |
| WO | WO 2009/064275 A1 | 5/2009 |
| WO | WO 2012/098330 A1 | 7/2012 |

* cited by examiner

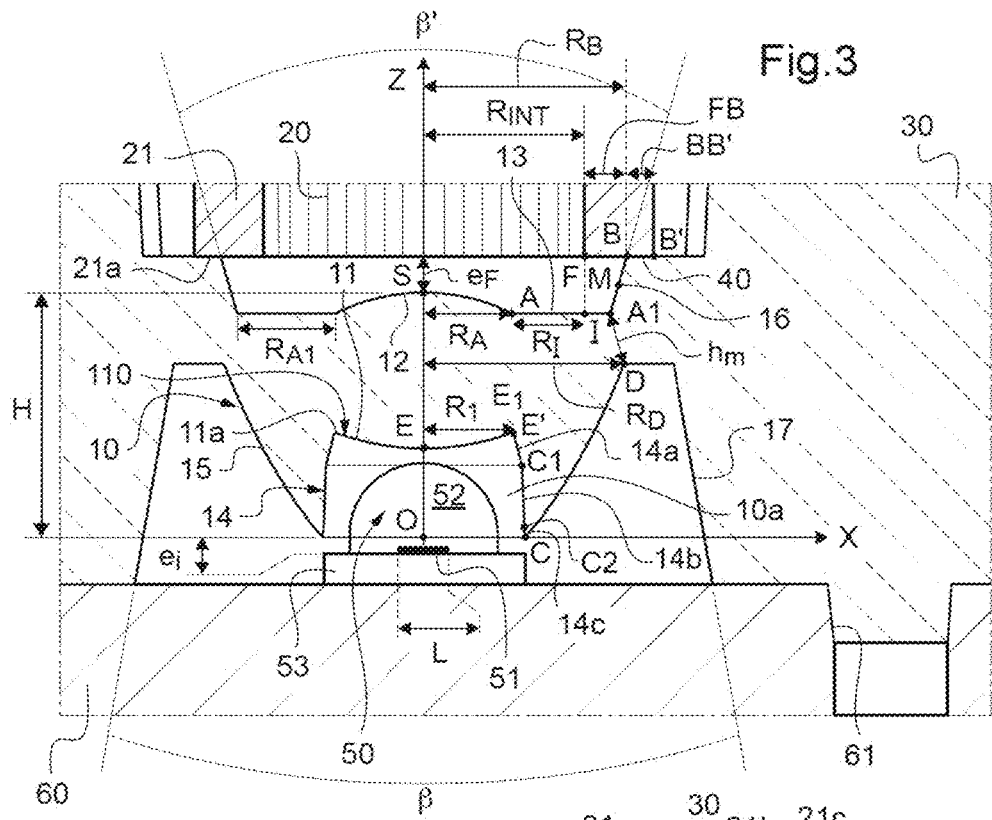
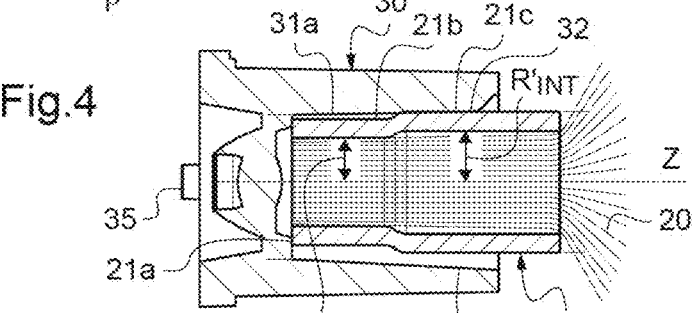
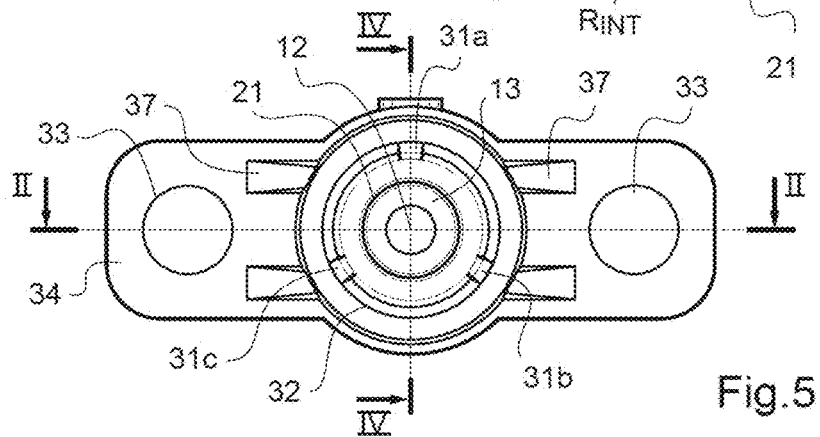

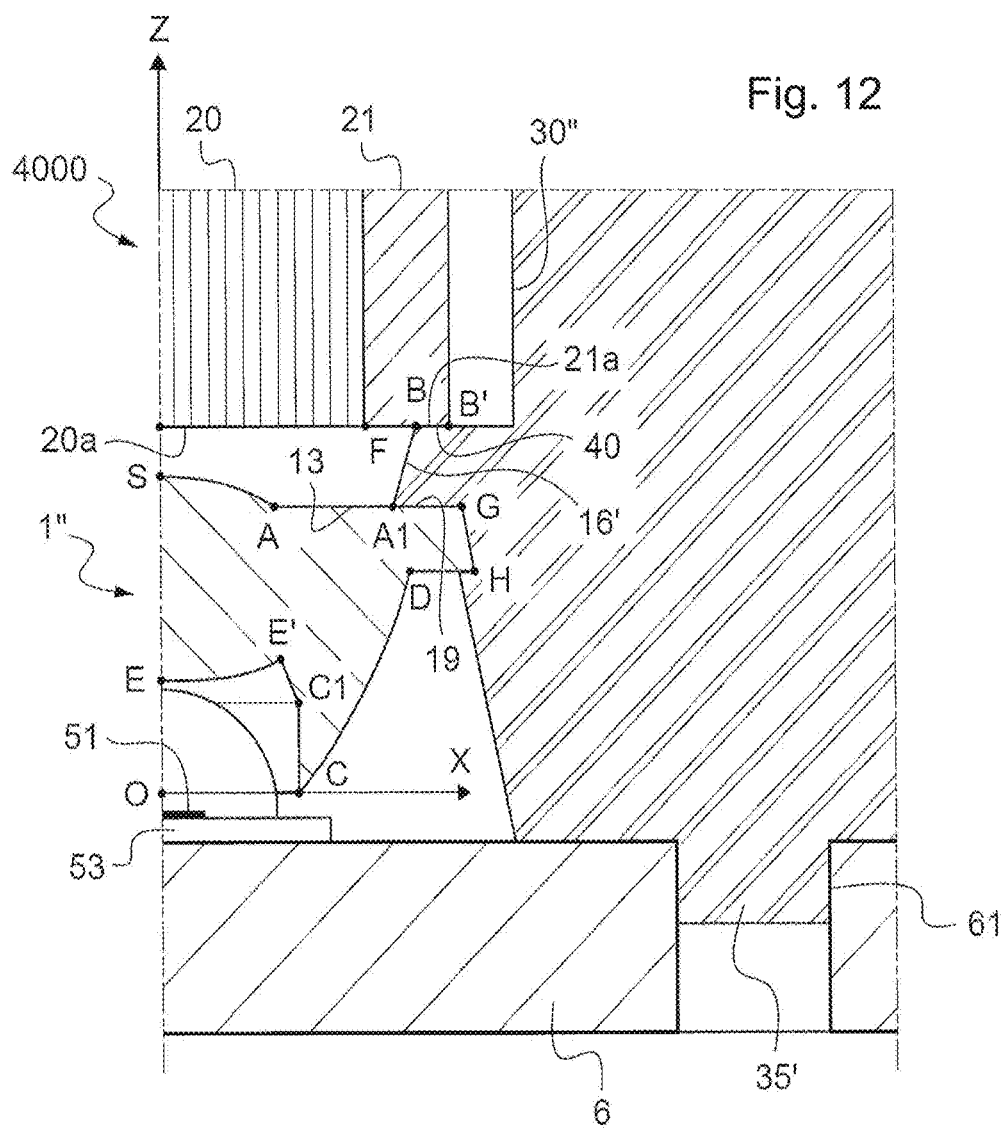

OPTOMECHANICAL SYSTEM FOR INJECTING LIGHT, OPTICAL COUPLER OF SAID SYSTEM ILLUMINATING DEVICE WITH SAID SYSTEM

CROSS-REFERENCE TO RELATED APPLICATIONS

This application is the U.S. National Stage of PCT/FR2014/051959, filed Jul. 29, 2014, which in turn claims priority to French patent application number 1357461 filed Jul. 29, 2013. The content of these applications are incorporated herein by reference in their entireties.

The present invention relates to an optomechanical system for injecting light into an optical medium (guide or extractor), to the optical coupler of this system and to an illuminating device with said system.

The invention more particularly relates to an optomechanical system for injecting light into a thin optical medium, the optical collector of which is formed of a bunch of optical fibers forming a thin injection ribbon for injecting light, especially into a thin light-extracting medium that is a light-emitting fabric comprising optical fibers.

In the technology of light-emitting fabrics, for example described in patent FR 2 859 737, illuminating surfaces are produced by weaving organic optical fibers with textile fibers.

Patent application WO 2007/003857 A, which relates to the field of (advertising) 6-sheets backlit by means of a ribbon of optical fibers able to emit light laterally, describes an optomechanical system for injecting light.

Such as shown in FIG. 1, the 6-sheet may be very small in thickness. The frontside of this 6-sheet therefore comprises an advertising medium backlit by a light source. This light source comprises a ribbon of optical fibers placed facing the backside of the medium.

Such as shown in FIG. 2, the ends of each of the optical fibers are gathered in a ring tie able to keep each of the fibers in a preset position relative to the others. The various ring ties are positioned inside a housing formed in a rail. This rail allows the ring ties to be positioned facing point light sources and, at the same time, the ribbon to be spread. The point sources are arranged on a mechanical carrier.

Such as shown in FIG. 3, substantially reproduced in the present application and renamed FIG. 1, an optical system 11' concentrates the light beam emitted by the point source 9' only in the direction of the ring tie 6'. Such an optical system 11' comprises a centering holder 12' in order to allow the optical system to be put in place on the optical axis of the point source 9' automatically. Moreover, an aligning member 20' allows the ring tie 6' to be positioned on the optical axis of the source 9', Specifically, the aligning member 20' interacts with a housing 10' added to the rail 7' allowing the ring tie 6' to be positioned facing the source 9'. A nut 21' then allows the ring tie 6' to be immobilized relative to the rail 7'.

However, it turns out that the spatial uniformity of the luminance, which is an important parameter of such luminous surfaces, is unsatisfactory.

Thus, the solution described is not suitable for illumination applications, in particular functional illumination applications, that require both a high efficacy and a high uniformity.

The injection system described is also quite bulky and has a complex design and is difficult to manufacture.

Therefore, the objective of the invention is to provide a system for injecting light into a thin optical medium, which system simultaneously allows energy efficacy (lm/W), and therefore the light flux incident on the optical collector (preferably a bunch of optical fibers in a ring tie) and contained in the numerical aperture of the latter, to be maximized while optimizing the spatial uniformity properties of the injection, said system necessarily being compatible with the requirements of industry (manufacturing tolerances, cost and simplicity), robust (mechanical strain impacting optical performance) and as compact as possible (thereby furthermore decreasing the final bulk of the illuminating device).

Naturally, effective injection of light into the collector, then into the injection ribbon, and the uniformity of the injection into the collector, then into the injection ribbon, are two necessary conditions for obtaining, in fine, the performance desired for the thin illuminating device:

optical performance: luminous efficacy especially higher than 40 lm/W in order to work toward illumination that is relatively energy-efficient relative to the light sources currently available on the market; to do this, the following will preferably all be achieved/employed: an injection efficiency of higher than 40%, a point light source with a luminous efficacy of higher than 130 lm/W and a light extraction efficiency of higher than 80%; and quality of the illumination: spatial uniformity of the luminance of the luminous surface.

For this purpose, the first subject of the invention is an optomechanical system for injecting light, especially into a thin optical medium (smaller than 2 cm, and preferably subcentimeter-size, in thickness), the system comprising:

an optical coupler (able to form a collimator and a concentrator of light) that comprises (preferably consists of) a (transparent and preferably axisymmetric) body of (central) axis Oz, O being the center of the entrance of the optical coupler, including (preferably consisting of) integrally formed:

a lens of (central) axis coincident with the axis Oz, of preferably subcentimeter-size or preferably millimeter-size maximum width W, comprising (preferably consisting of):

a convex entrance face (which is therefore curved toward the entrance of the coupler) of radial extent $R_1$ especially smaller than 5 mm, and preferably larger than 1 mm, said entrance face preferably being axisymmetric and especially also defined by a central extent, on the axis Oz, called $h_e$;

a convex central exit face (which is therefore curved toward the exit of the coupler), defined by a central extent, on the axis Oz, called H and preferably smaller than W, which is especially subcentimeter-size and even preferably millimeter-size or even more preferably smaller than 5 mm, and of radial extent $R_A$ (especially smaller than 2.5 mm and preferably larger than 0.5 mm, said central exit face preferably being axisymmetric (dome, etc.)); and a peripheral exit face, especially (and preferably) axisymmetric, that comprises (or consists of) a part joined to the central exit face, especially of representative lateral dimension $R_1$, said part being flat (and preferably annular) or concave (curved toward the entrance of the coupler) or frustroconical and thus flared in the direction of the exit of the system;

a cavity, of (central) axis coincident with the axis Oz, of central height equal to $h_i$, comprising a bottom containing the entrance face, and a lateral surface, called the entrance lateral surface, said cavity (of depth $h'_E$ at the junction with the entrance lateral surface) preferably being axisymmetric and especially frustroconical; and a peripheral reflective surface encircling the lens and the cavity, of (central) axis coincident with the axis Oz, able to totally internally reflect the light rays refracted by the entrance lateral surface, said peripheral reflective surface extending beyond the entrance face (therefore beyond the bottom of the cavity) in the direction of the exit of the optical coupler, said peripheral reflective surface preferably being axisymmetric;

an optical collector, of (central) axis coincident with the axis Oz, with as entrance, a surface, called the (light-ray) collecting surface, facing the central exit face (and at least the part of the peripheral exit face joined to the central exit face) of millimeter-size radial extent $R_{INT}$ preferably smaller than 6 mm, and even smaller than 5 mm, and by a numerical aperture NA smaller than 1 (preferably smaller than or equal to 0.6) and comprising a jacket having (as entrance) a given (so-called) end (also called free) surface, said collector preferably being axisymmetric, the optical collector comprising a (circular, hexagonal, etc.) bundle of optical fibers, said optical fibers having a diameter smaller than 1.5 mm and the central exit face and the (optically functional) peripheral exit face being spaced apart from the collecting surface; and a member for aligning the optical collector with the optical coupler, especially of (central) axis coincident with the axis Oz and therefore coaxial with the optical coupler, the optical coupler and the aligning member being integrally formed or being indirectly or directly fastened together (by a fastening system preferably attached to or on a carrier of the light source of the injection system), the central distance $e_F$ on the axis Oz between the collecting surface and the central exit face being nonzero and smaller than 5 mm, preferably smaller than or equal to 2 mm, even more preferably smaller than or equal to 0.6 mm and preferably larger than 0.2 mm, the optomechanical system (preferably the body of the optical coupler and/or optionally the aligning member) comprising a stop surface against which the end surface abuts.

The optomechanical system according to the invention obtains the best compromise between the magnitude and spatial uniformity of the light flux injected into the numerical aperture of the collecting surface of the optical collector, with the aim of making the visual appearance of the thin illuminating device as attractive as possible, and allows high-power applications and, among the most demanding, functional illumination applications, to be addressed.

The optical coupler according to the invention is innovative firstly because of the design (lens, cavity, peripheral reflective surface) of the optical collector of small radial extent (preferably $R_{INT}$ is smaller than 6 mm) and because the light is injected into a thin medium (smaller than 2 cm, preferably smaller than 1 cm in thickness) but also because the optical coupler according to the invention is able to function in close proximity to the stop surface, thereby allowing the optical alignment of the optical collector, which is placed a very small distance away from the exit of the lens, to be perfected.

Surprisingly, by virtue of the design according to the invention, W may be particularly small without generating too many losses.

In the cited prior art, the bundle is not located in close proximity to the exit face, said exit face furthermore being parabolic and therefore not having a convex central face. From a mechanical point of view, the optical alignment is complex because it depends on the peripheral rail and requires a housing, the screw fastening is to the side of the ring tie and the lens requires an individual centering holder, and no stop surface is provided.

According to the invention, the entrance face and the central exit face are able to orient or maintain (divergent) central light rays (divergent in the sense that they are not precollimated) that are refracted by the entrance face and the central exit face toward or in the numerical aperture NA of the collecting surface of the collector. The peripheral reflective surface and the peripheral exit face are furthermore able to orient or to maintain (divergent) oblique light rays (divergent in the sense that they are not precollimated) refracted by the entrance lateral surface.

The lens treats the light rays in essentially two different ways:

central light rays refracted by the bottom of the cavity are entirely or mainly inscribed in the central exit face of radial extent $R_A$; and oblique light rays refracted by the entrance lateral surface are then (for the most part) reflected (by total internal reflection) by the peripheral lateral service and (for the most part) refracted by the typically annular peripheral exit face of width $R_{A1}$, thus escape of rays lost beyond the end of the peripheral exit face at the edges of the stop surface, and for example the escape of rays lost because not refracted by the peripheral lateral surface, is minimized.

This separation aims, to a first approximation, to project these two populations of central and oblique rays onto two separate zones of the collector: a central (preferably disc-shaped) surface of radial extent $R'_A$ and a (preferably) annular surface of width $R'_{A1}$.

After the optical collector has been placed abutting against the stop surface, the optical collector is sufficiently close to the exit of the lens, without touching it, for the following relationships to be approximately respected: $R'_A = R_{A1}$ and $R'_{A1} = R_{A1}$.

This conservation of geometric extent is achieved by correctly positioning the point light source and via its small distance to the entrance face of the lens and to the entrance lateral surface.

Preferably, the light source:

is Lambertian (in the far field); such as a light-emitting diode (LED) possessing, in accordance with the nominal Lambertian source, a viewing angle of 60° (angle at which the light intensity corresponds to half its peak value);

comprises primary optics (preferably a dome);

is slightly set back from the entrance of the coupler;

has an active zone of width L preferably between 500 μm and 3 mm and even in a range from 1 to 2 mm; and has a luminous efficacy of at least 130 lm/W.

Without primary optics, the source may get too close to the entrance face.

The light source chosen is preferably polychromatic and especially white. The color of the light emitted is preferably an illumination between 2700K and 8000K, preferably of the "daylight" type at 5500K.

The convexity of the entrance face of the lens contributes to the compactness of the lens (small height H) above all when the optical collector has a very small radius $R_{INT}$.

The convexity of the central exit face allows the light rays to be redressed and maintained in the central region and is chosen depending on the convex shape of the entrance face.

Moreover, the cavity and the peripheral reflective surface are crucial because a simple aspheric biconvex lens would induce a substantial loss of flux, in particular with a Lambertian source (defined as such in the far field) such as an LED.

The entrance face may preferably have an aspheric surface. The equation of the surface of the aspheric entrance face is preferably written:

$$z(r) = \frac{r^2}{R\left(1 + \sqrt{1-(1+k)\frac{r^2}{R^2}}\right)} + A_4 r^4 + A_6 r^6 + A_8 r^8 + \ldots$$

where k preferably equals zero.

The optimal coefficients are defined in the following table:

| | Convex entrance face | | | | |
|---|---|---|---|---|---|
| | conical constant (k) | R in mm | $A_4$ | $A_6$ | $A_8$ |
| Aspheric coefficients | 0 | 4.50 | 0.01 | −0.001 | 0 |

The central exit face may preferably have an aspheric surface.

The equation of the surface of the aspheric central exit face is preferably written;

$$z(r) = \frac{r^2}{R\left(1 + \sqrt{1-(1+k)\frac{r^2}{R^2}}\right)} + A_4 r^4 + A_6 r^6 + A_8 r^8 + \ldots$$

where k preferably equals zero.

The optimal coefficients are defined in the following table:

| | Convex exit central face | | | | |
|---|---|---|---|---|---|
| | conical constant (k) | R in mm | $A_4$ | $A_6$ | $A_8$ |
| Aspheric coefficients | 0 | 3.00 | 0 | 0 | 0 |

The lens, the cavity and the peripheral reflective surface (and also the optical collector and even the aligning member) are preferably axisymmetric.

To obtain a high uniformity in combination with an optimal efficacy, it may be desirable to redistribute a fraction of the central and oblique rays, i.e. to direct the central rays toward the peripheral region and the peripheral rays toward the central region, in order to mix the central and oblique rays.

Preferably, the so-called optical point response is used to define the features of the lens so as to obtain this noteworthy optical performance.

Thus, the two populations of oblique and central light rays preferably undergo a certain amount of mixing. More precisely, the optical coupler may preferably have at least one of the following features:

the bottom of the cavity, the central exit face and the peripheral exit face are such that, in operation, light rays refracted by the bottom of the cavity and especially originating from a point on the axis Oz (preferably within the distance $e_1$, especially slightly larger than $h_e$, smaller than 0.5 mm, 0.2 mm for example) are refracted by the peripheral exit face and thus are deflected away from the axis Oz, rather than being refracted by the central exit face;

and preferably, in operation, light rays, especially originating from a point on the axis Oz (preferably within the distance $e_i$, especially slightly larger than $h_e$, smaller than 0.5 mm, 0.2 mm for example) first refracted by the entrance lateral surface then on the peripheral reflective surface meet at the collecting surface in a zone common to light rays especially originating from a point on the axis Oz (preferably within the distance $e_i$, especially slightly larger than $h_e$, smaller than 0.5 mm, 0.2 mm for example) and first refracted by the bottom of the cavity (within a distance d substantially equal to $R_A$ of the axis Oz, $R_A < d < 1.5 R_A$ for example).

In this preferred embodiment, the peripheral exit face is able to refract and thereby orient or maintain light rays refracted in the (most) peripheral zone of the bottom of the cavity, especially an optionally flat (annular) part joined to the convex entrance face and/or bordering the convex entrance face, toward or in the numerical aperture NA of the collecting surface of the optical collector.

The optical coupler may preferably have at least one of the following features:

if necessary rays (called sacrificial rays) especially originating from a point on the axis Oz (preferably within the distance $e_1$, especially slightly larger than $h_e$, smaller than 0.5 mm, 0.2 mm for example) refracted by the entrance lateral surface propagate into the (transparent) body without encountering the peripheral reflective surface (which is further down) and do not travel to the exit face of the coupler;

if necessary rays (called parasitic rays) especially originating from a point on the axis Oz (preferably within the distance $e_1$, especially slightly larger than $h_e$, smaller than 0.5 mm, 0.2 mm for example) refracted by the entrance lateral surface then travel to the peripheral exit face and then to the jacket of the collector, thus preventing rays that lead to nonuniformities from accessing the collecting surface.

It is desired to couple the light source (preferably an LED light source) to the optical collector with the maximum possible efficacy and uniformity.

Regarding the conservation of the geometric extent, if:

the source is a surface approximated by an emissive disc of diameter $\Phi_s$ (for example 1 mm for an LED source) emitting light into the upper half-space at angles θ1 (for example up to 90° for an LED source) where n is the refractive index of the primary lens (for example a transparent dome of the LED source) typically formed by a silicone resin or an epoxy resin;

the optical collector arrays a surface of diameter $\Phi_{int}$ (where $\Phi_{int}=2R_{INT}$) having an angular acceptance cone in air (n'=1) θ' equal to 30° (numerical aperture 0.5).

Problems with concentrating light flux, i.e. the transformation of a source [aperture 1, angle 1]/collector [aperture 2, angle 2] pair are addressed by the theorem of conservation of geometric extent:

$$\Phi_{int} n' \sin(\theta') = \Phi_s n \sin(\theta 1)$$

The minimum area of the collector may then be estimated by the simplified formula $$\Phi_{int}=2n\Phi_s$$

namely $R_{INT}$ comprised between 0.75 mm and 2.8 mm for n comprised between 1.5 and 1.6 and $\Phi_s$ comprised between 0.5 mm and 1.5 mm.

Thus, in a preferred embodiment, $R_{INT}$ is larger than or equal to 1.5 mm. Preferably $R_{INT}$ is smaller than 3.0 mm, in a range extending from 2.0 mm, preferably from 2.2 mm to 2.6 mm. The smaller the source, such as a diode (LED), the less the injection of the emitted light into a given collector will be critical, especially with respect to the position of the collecting surface of the collector and the exit face of the optical coupler (typically adjustment of the alignment along Z and of the central distance $e_f$). The smaller the illuminated surface of the collector, the more the illumination of the surface of the collector will be intense. A collector of $R_{INT}$ equal to 2.5 mm is therefore preferable to a collector of $R_{INT}$ equal to 1.5 mm.

For an optical collector of given radial extent $R_{INT}$, an optical coupler according to the invention such that:
  $1.88R_{INT}<W<3.1R_{INT}$;
  $0.4R_{INT}<R_1<0.66R_{INT}$; and
  $0.41R_{INT}<R_A<0.68R_{INT}$
may advantageously be chosen.

Also preferably (in a first embodiment of the peripheral exit face), if the part (especially without discontinuity) of the peripheral exit face joined to the central exit face is flat (especially annular) or frustroconical (and flared in the direction of the exit of the system) then $0.46R_{INT}<R_{A1}<0.76R_{INT}$, where $R_{A1}$ is the radial distance between A and A1, where A is the lateral end of the peripheral exit central face and A1 the lateral end of the exit central face, especially making contact and/or joined to a (frustroconical, annular) ramp leading to the stop surface (at the internal edge B).

In a preferred embodiment, especially for $R_{INT}$ smaller than 3.0 mm and even in a range from 2.2 to 2.6 mm, the optical coupler is defined by the following dimensions:
  W smaller than 10 mm, preferably smaller than 7 mm;
  H smaller than W, especially H smaller than 4 mm and preferably larger than 3.6 mm;
  $R_A$ smaller than 1.6 mm, even than 1.5 mm and preferably larger than 1.2 mm; R1 is smaller than 1.6 mm and preferably larger than 1.2 mm; and
  $h_E$, maximum depth of the bottom of the cavity smaller than 1.8 mm and preferably larger than 1.4 mm.

Furthermore, it may be preferable for $R_{A1}$ the width of the peripheral exit face to be chosen to be flat (preferably annular) or frustroconical and smaller than 1.7 mm and preferably larger than 1.3 mm.

Furthermore, the optical system may preferably be defined by:
  $e_F$ smaller than 2 mm, even more preferably than 1 mm, and preferably larger than 0.5 mm; and/or
  $e_i$ distance between O and the light source on the axis Oz smaller than 0.5 mm and preferably outside of the cavity.

Preferably, the end surface of the jacket extends beyond the internal edge B of the stop surface, B being of radial extent equal to $R_B$, therefore $R_{INT}$ is smaller than $R_B$.

The end surface faces the peripheral exit face (beyond I, in the direction away from the center of the coupler).

Furthermore and preferably $0.30R_{INT}<R_f<0.60R_{INT}$ (and/or $R_f<R_A$) where $R_f$ (lateral dimension representative of the peripheral exit face) is the radial distance between A and I, where I is the projection (along Oz) onto the peripheral exit face of the internal edge F of the jacket (in other words the external edge of the collecting surface) and where A is the lateral end of the exit central face.

The stop surface does not make point or linear (circle, etc.) contact but instead the jacket of the collector bears against it over a certain width, preferably of at least 0.2 mm and even at least 0.4 mm.

The stop surface may be manifold and discontinuous, therefore multiple points of contact (with a plurality of bearing surfaces preferably regularly distributed over 360°) or preferably a continuous collar-type surface, for example. It is preferably axisymmetric.

The (continuous or discontinuous) stop surface may comprise means for fastening or assembling the aligning member with the coupler (when it is disassociated from the optical coupler).

The stop surface may be flat (and the end surface of the collector is preferably also flat) and especially annular.

The stop surface may be axisymmetric and is advantageously frustroconical (and flared in the direction of the exit of the system) and the end surface is of complementary shape to the stop surface (beveled external edge, etc.) and especially forms the negative of the frustroconical stop surface. This system allows the optical alignment of the collector to be even further improved by radial centering.

The stop surface, in close proximity to the peripheral exit face, does not adversely affect the desired overall uniformity. Preferably, the stop surface does not receive light rays (or receives light rays in a negligible amount) from the coupler.

The peripheral exit face may preferably have at least one of the following features:
  it has no discontinuity (especially vertical discontinuity, along Oz) or step with the central exit face;
  it extends sideways further than the entrance lateral surface;
  it is optionally a surface without an optical texture, such as for example a Fresnel lens, for design simplicity.

An integral part of the body, the peripheral exit face is preferably molded (therefore has been demoldable). Preferably, it is not convex.

Regarding the extent of the peripheral exit face, two particular cases are defined:
  first case (already mentioned): the part joined to the central exit face forms the peripheral exit face, is flat (notwithstanding optional optical texturing), or frustroconical (flared in the direction of the exit of the system) and especially set back from the stop surface, therefore of lateral end A1, the central exit face in any event preferably protruding from this joined part;
  second case: the part joined to the central exit face is concave and rises continuously (relatively abruptly) as far as the internal edge B of the stop surface.

The stop surface (of the body or of the aligning member) is preferably as close as possible to the peripheral exit face (of the end A1 in the first case) for example separated by less than 1 mm from the end A1.

A ramp (first case) or a continuous rise (second case, especially defined from I as far as B) without an optical role (therefore not serving to refract light rays even when sufficiently collimated in the optical collector) or at least with a negligible optical role is preferred.

The ramp is preferably frustroconical, flared in the direction of the exit of the system, especially over a distance that is as short as possible, preferably smaller than 1 mm.

Naturally, the physical end of the peripheral exit face A1 preferably corresponds substantially to the end of the optical functionality of the peripheral exit face. This will depend on the entrance lateral surface and on the source, especially on its spatial extent, angular properties and its radiation (in particular in the near field) and its position on the axis Oz relative to the cavity.

The transparent body—or even any intermediate adhesively bonded part—preferably does not comprise a surface adjacent to the peripheral exit face, which would especially be higher up, and not able to form the stop surface because its shape and/or its insufficient height would necessarily lead to contact between the collecting surface of the collector and the lens.

For the sake of simplicity and optical alignment, the stop surface is preferably integrated into the body of the optical coupler and is also preferably frustroconical.

In the second case the peripheral exit face joined to the central exit face is (slightly) concave, for example defined by a $4^{th}$ order polynomial equation, the central exit face preferably protruding from this concave part.

The peripheral reflective surface gets further away from the entrance lateral surface and from the entrance face in the direction of the exit of the coupler and:
is preferably of maximum extent $z_D$ along Oz larger than H/2 (in order not to lose too many rays) and preferably smaller than the minimum extent $z_A$ of the collimating face and/or than the minimum extent of the peripheral exit face;
and/or preferably the minimum distance hm, called the minimum material entrance distance, between the peripheral reflective surface and the peripheral exit face is larger than 0.8 mm (and even if possible the minimum distance between the peripheral reflective surface and the stop surface if integrated into the coupler is larger than 0.8 mm), in order to facilitate the injection of the hot plastic (preferred material of the lens) if needs be;
and/or is preferably of radial extent $R_D > R_{INT}$ (more preferably $R_D > R_{A1}$, even $R_D > R_B$) and $R_D > 1.3 R_{INT}$ where D is the physical limit of the peripheral reflective surface, preferably defining the width W (equal to $2R_D$), or at least the limit of the optically functional surface of the peripheral reflective surface.

The peripheral reflective surface may furthermore preferably have at least one of the following features:
it has an external surface that does not make optical or even mechanical contact (free surface) and/or that is untreated;
and/or it starts from the end of the entrance lateral surface or is separated by an (annular) flat from the entrance lateral surface;
and/or it is a continuous surface, without discontinuities or without "splines" such as defined in patent application WO 2009/064275 for example.

The peripheral reflective surface may preferably have an aspheric surface. The equation of the aspheric peripheral reflective surface is preferably written:

$$z(r) = \frac{r^2}{R\left(1 + \sqrt{1 - (1+k)\frac{r^2}{R^2}}\right)} + A_4 r^4 + A_6 r^6 + A_8 r^8 + \ldots$$

where k is preferably equal to −1.
The optimal coefficients are defined in the following table:

| | Peripheral reflective surface | | | | |
|---|---|---|---|---|---|
| | conical constant (k) | R in mm | $A_4$ | $A_6$ | $A_8$ |
| Aspheric coefficients | −1 | 1.25 | −0.00569 | 0.0001373 | 0.00002663 |

The entrance lateral surface allows oblique rays to be refracted and thus a substantial part of the oblique light emitted by the (preferably LED) source to be collimated. It is not enough to associate a central lens having a convex entrance face and a flat central exit face because the distribution of the light concentrated on the collector is then not uniform enough on the surface of the collector.

The entrance lateral surface may preferably have at least one of the following features:
it is demoldable (surface containing at least one hollow to be avoided);
it is preferably frustroconical over at least one (first) surface portion closest to the bottom of the cavity, said portion being flared in the direction of the entrance of the coupler, said first surface portion preferably being extended by one or more other frustroconical portions that are flared in the direction of the entrance of the coupler;
it is of radial extent $R_C > R_1$ and preferably $R_C > R_4$, where C is the lowest point in the cavity (of extent in z equal to 0).

Peripheral peaks on the illumination map are decreased as well as can be by inclining (at least) this surface portion closest the bottom of the cavity, called the first frustroconical portion. As a variant, this first portion may be cylindrical.

Provision may be made for:
a second frustroconical portion, preferably higher (along z) than the first portion, having a second inclination, relative to the axis Oz and with distance from the entrance face, which is smaller than the first inclination (slope at least 5 times and preferably better still 8 times lower) and flared in the direction of the entrance of the coupler;
and optionally, for purposes of mechanical protection, a third (shorter) frustroconical surface portion flared in the direction of the entrance of the coupler, having a third inclination and preferably extending as far as the end of the peripheral reflective surface.

Over all the surface portions, the differences between each slope and the slope of the line passing through the 2 end points of the longitudinal cross section of the entrance lateral surface is preferably smaller in absolute value than 2° and the associated standard difference is preferably smaller than 10°.

Preferably, if the light source is equipped with a primary dome the latter is mainly inserted into the cavity.

For example, the distance between the surface of the dome and the entrance lateral surface is larger than 100 μm and is smaller than 500 μm.

For example, the distance between the surface of the dome and the entrance central face is larger than 100 μm and smaller than 300 μm and preferably smaller than or equal to 200 μm.

Preferably, the (almost point) light source, such as a diode, is Lambertian in the far field and is comprised between 500 μm and 2 mm in extent, for example 1.5 mm.

The entrance central face preferably forms at least 90% of the bottom and may optionally be extended, preferably without a step/discontinuity, by a flat (preferably annular) peripheral entrance face, of width $R'_1$ smaller than $0.5R_1$ even than $0.1R_1$. This optional flat between the entrance face and the entrance lateral surface for example serves to redirect light rays originating from a source on the axis Oz toward the periphery of the illumination map.

The optical coupler may consist only of a transparent and preferably plastic material, especially PMMA (polymethyl methacrylate) and preferably PC (polycarbonate) which is less brittle. It may therefore preferably be molded, for ease of industrialization.

Injection molding is a process that employs thermoformable materials and notably thermoplastics. Most thermoplastic parts are manufactured with injection presses: the plastic is softened then injected into a mold, and then cooled. Injection molding is a technique used for large-scale or very large-scale mass production of parts. It is above all used with plastics and elastomers (rubbers). Contrary to other processes in which the mold is discarded after use (sand molding, disposable wax molding etc.), care is taken to ensure that the injected parts do not get trapped in the molds and that they can in contrast be demolded without degradation. This is the reason why surfaces that are not very large are not parallel to the extraction direction, but differ therefrom by a small angle called the "draft" angle.

The dimensions of the design of the optical coupler (and/or the aligning member) preferably meet constraints related to the injection molding step. They mainly aim to facilitate the injection of the hot plastic (thus $h_m > 0.8$ mm) and demolding (entrance angle $β > 2°$ and exit angle $β' ≥ 20°$). Moreover, it will again be noted that hollow optical shapes are not producible with the injection-molding technique.

Thus, the minimum draft must preferably be larger than 0° and preferably at least 1° and even at least 3°.

The refractive index of the optical coupler is typically 1.5 at 550 nm.

According to the invention, the expression "millimeter-size" is understood to mean a value lower than 10 mm and of at least 1 mm.

According to the invention, the expression "submillimeter-size" is understood to mean a value lower than 1 mm.

According to the invention, the expression "subcentimeter-size" is understood to mean a value lower than 1 cm.

The optical collector and the aligning member are securely fastened. The use of additional fastening rails taking the form of a bulky and complex peripheral frame as in the prior art is preferably avoided.

The optical collector is preferably directly assembled, preferably mechanically, (fitted) into the aligning member, which is located in close proximity to the peripheral exit face and/or the stop surface. The optical collector is held by its jacket in the aligning member and may be easily fitted and demounted.

The aligning member is preferably directly assembled to the coupler, preferably mechanically, or even forms part of the coupler (a monolithic part), and, lastly the coupler is added and fastened via a printed circuit board (PCB) carrier, bearing the almost point light source such as a diode (LED).

The aligning member is for example securely fastened to the optical coupler by fastening means (mechanical means such as a flange(s), a screw, clip fastening means, snap fastening means, by force-fitting or even magnetic or adhesive bonding means), said means being integrated into the stop surface belonging to the coupler or into a surface of the coupler removed from the stop surface and optionally closer to the entrance of the coupler.

Alternatively, the optical coupler is preferably directly assembled to the aligning member (which incorporates the stop surface), and lastly the aligning member is added and fastened via a PCB carrier (and aligned) bearing the almost point light source such as a diode (LED).

For example, the coupler incorporates mechanical fastening means such as notches, clip-fastening means, clamping ribs, force-fitting means or even magnetic or adhesive bonding means in a dedicated part of the coupler ("lobe", flank) that is preferably located above the peripheral lateral surface and below the stop surface belonging to the aligning member (connection therefore closer to the entrance of the coupler) and/or below the peripheral exit face (or in its lateral extension).

The aligning member may preferably have at least one of the following features:
  it is made of plastic (molded, etc.) especially of transparent or opaque polycarbonate (PC) and especially of the same material, or at least of a material having the same thermal expansion coefficient, as the coupler; and
  in particular is integrally formed with the coupler, and for assembly with the optical coupler, it preferably has at least one of the following features:
  a variable lateral dimension (typically diameter) that increases with Z (with distance from the coupler);
  it comprises clamping ribs or means for fitting the optical coupler, such as bayonets or force-fitting means; and
  it encircles the jacket in a first region (especially a crimped region of the jacket) and clamps it in a second region called the clamping zone (demountable fitting) of sufficient length to ensure the collector is mechanically fastened and aligned.

For example, the optical collector has a circular or hexagonal cross section and the aligning member is a cylinder. As a variant, if the collector is square, then the aligning member is a rectangular parallelepiped of square cross section.

The collecting surface of the collector is preferably flat and polished.

Also, for compactness and to make fitting and optical alignment easier, in a preferred embodiment:
  the aligning member, which is preferably axisymmetric and of axis coincident with the axis Oz, houses the optical collector (inclusive of jacket) that itself is preferably axisymmetric and preferably a bunch of optical fibers; and
  the body and/or the aligning member incorporates the stop surface;
  and preferably the body incorporates the aligning member.

It is preferable to incorporate the body (the optical coupler) into the design of the aligning member if possible, for a number of reasons:

the latter are very small in size (especially the coupler) therefore it is difficult to incorporate fastening tabs (for clip-fastening for example) into the system;

the fastening, for example clip fastening, requires mechanical connections to be present, these connections being less strong than a monolithic structure, especially if the fastening is subjected to substantial stresses, for example those that may be applied during fitting and demounting operations;

it is necessary to develop two parts and therefore two molds leading to a higher tooling cost and a longer development time.

An alternative route at least allowing optical performance to be maintained, even if it is a less preferred route, consists nonetheless in using two independent parts, the optical coupler and the aligning member, said parts preferably being centered (along the axis Oz) and aligned with each other via an interaction between the (PCB) source carrier and at least (and preferably only) the optical coupler, and immobilized along Oz by fastening to the (PCB) source carrier.

The injection system may comprise an (almost point) light source, especially a light-emitting diode (LED):

of small thickness smaller than 2 mm, package and primary optics optionally included;

the emissive zone of which is centered on the axis Oz and placed at a distance $e_i$ on the axis Oz smaller than 0.4 mm under the center 0 of the entrance of the coupler;

with a subcentimeter-size or even submillimeter-size base (or package) made of plastic, for example of FR-4, or of a ceramic—the base itself resting on and being electrically connected to a (generally flat, flexible or rigid) source carrier that is preferably a printed circuit board (PCB) carrier that is for example made of FR-4 or a metal such as aluminum.

The optical coupler preferably incorporating the aligning member may thus rest on the printed circuit board (PCB) carrier, via one or more bearing surfaces of the coupler, preferably protruding relative to the cavity, said bearing surface(s) being spaced apart from the peripheral reflective surface—leaving a gap between the entrance O of the coupler and the (PCB) source carrier, (and even the source).

The optical coupler preferably integrating the aligning member may be securely fastened to the (PCB) source carrier; preferably the (PCB) source carrier and one or more (lateral) zones (especially lateral to the peripheral reflective surface) of the coupler, especially protruding relative to the cavity, comprise complementary (male/female, force-fitting) assembly means thus forming a system (blocking laterally and roughly along Oz) for self-centering the almost point source with the optical coupler, and optionally additional locking means (blocking along Oz).

If not, the optical coupler may be (securely fastened) assembled in the aligning member that rests on the (PCB) source carrier and is securely fastened to the (PCB) source carrier. Preferably, one or more areas of the aligning member and the (PCB) source carrier comprise complementary (force-fitted male/female) assembly means thus forming a system for self-centering (blocking laterally and roughly along Oz) the almost point source (diode) on the optical coupler, and optionally additional locking means (blocking along Oz).

For example, the complementary assembly means comprise at least two male members such as tenons on two bearing surfaces of the coupler or of the aligning member bearing the coupler (backside of two fins preferably aligned on either side of the lens), said tenons being fitted (inserted) into the (PCB) source carrier that is apertured for this purpose (blind or through-holes at least forming two female members). For example, more precisely, at least two tenons on two bearing surfaces of the coupler or of the aligning member bearing the coupler (backside of two fins preferably aligned on either side of the lens) are force-fitted by virtue of their conical shape into the (PCB) source carrier that is apertured for this purpose (blind or through-holes). To within the manufacturing tolerance (for example ±100 µm), the diameter of the aperture in the source carrier is adjusted so that it corresponds to the lower diameter of the tenon. As the upper diameter of the tenon is slightly larger, this rightly allows the coupler or aligning member to be force-fitted into the source carrier.

Thus, exact self-centering of the three elements: the light source such as an LED, the optical coupler and the optical collector in the aligning member, is guaranteed. Furthermore, at the moment of fitting, the complementary assembling means prevent lateral movement of the entrance lateral surface from deteriorating the light source (diode).

Preferably a single injection-molding operation is used to manufacture the entire system: optical coupler—aligning member of the collector—bearing zones and/or zones for fastening to the carrier and/or for centering relative to the light source.

It is desirable for each part of the system made up of the aligning member and collector, coupler and board (PCB carrier) to be easy to connect/disconnect.

The PCB carrier may itself be located on a heat sink such as a metal plate, especially made of aluminum. The optical coupler with the heat sink may be housed in a preferably metal housing comprising an aperture through which a part of the optical collector (bundle) is able to pass.

It is desirable for the grip of the aligning member on the collector to be sufficiently firm that the latter cannot be unintentionally deconnected, for example when a mechanical stress is applied to the (PCB) source carrier. The gripping force may be adjusted by adjusting the thickness of the ribs and/or by adjusting the outside diameter of the jacket.

Naturally, the invention also aims to protect key parts of the invention that are integratable into the aforementioned injection system.

Thus, one subject of the invention relates to the assembly comprising the optical coupler and the aligning member of the optomechanical system such as described above, said optical coupler and aligning member being securely fastened or able to be securely fastened (before fitting) or optionally forming a single part, the body or aligning member incorporating the stop surface against which the aforementioned optical collector bears.

Naturally, the optical coupler, like the aligning member, comprises the aforementioned preferred elements for centering and fastening to the source carrier and for fitting/demounting the optical collector in/from the aligning member.

Another subject of the invention relates to the optical coupler of the optomechanical system such as described above (alone), the body preferably incorporating the stop surface against which the aforementioned optical collector is able to bear.

Although less preferable, the optical coupler could be used in an alternative optomechanical injection system differing in that the end surface is not placed in abutment (the collecting surface nonetheless remains at $e_F$ and therefore near the central exit face). Thus, the system (coupler) will not comprise a stop surface.

Naturally, the optical coupler may comprise the aforementioned preferred elements for centering and fastening to the source carrier.

The optical collector according to the invention may preferably have at least one of the following features:
- it may comprise the (circular, hexagonal, etc.) bundle of optical fibers with optical fibers of diameter preferably smaller than 1 mm, even smaller than 750 µm; and
- it may have a jacket that is a metal ring crimped (preferably over at least a distance of 4 mm and at most 8 mm) then not crimped (preferably over at least a distance of 3 mm and at most 6 mm) gathering and gripping the ends of the (circular, hexagonal) bundle of optical fibers, the optical fibers organizing into at least one injection ribbon and especially then opening onto an preferably thin light-extracting medium.

The collector may comprise optical fibers (in the preferably crimped jacket) that may, independently or in totality, preferably have at least one of the following features:
- being of submillimeter-size diameter, especially 750 µm diameter and better still of a diameter smaller than 750 µm, preferably of 200 to 550 µm and more preferably of about 500 µm (typically between 470 and 530 µm) or even 250 µm;
- being of average power per fiber preferably comprised between 0.35% and 0.46% of the flux emitted by the (LED) source for fibers that are about 500 µm (typically between 470 and 530 µm) in diameter, or of average power per fiber between 0.075% and 1.35% of the flux emitted by the (LED) source of diameter between 250 µm and 750 µm;
- being of circular, even substantially circular, even hexagonal or even partially circular and partially hexagonal cross section, especially in a crimped zone of the jacket; and
- being chosen to be identical.

The optical fibers may be formed of a mineral or organic material composing the core of the optical fiber. The mineral materials for the core are for example chosen from the group comprising glass, quartz and silica. Organic materials for the core are for example chosen from the group comprising polymethyl methacrylate (PMMA), polycarbonate (PC), cyclo-olefin polymers (COPs) and fluoropolymers. The optical fibers may have a core (light guide) covered with a cladding of refractive index lower than that of the core and that may be of different nature. By way of example of particularly suitable core-cladding fibers, mention may be made of fibers comprising a core made of polymethyl methacrylate (PMMA) and a cladding based on a fluoropolymer such as polytetrafluoroethylene (PTFE). When the fibers used are core-cladding fibers the thickness of the cladding may be comprised between 2 and 15 µm and preferably between 5 and 10 µm.

The jacket may entirely encircle (preferably especially annular or frustroconical surface) or even encircle sections of (each section being annular or frustroconical, etc. forming a hoop, etc.) the collecting surface (the collecting part) of the collector.

A metal jacket (for example made of aluminum), drawing the optical fibers together onto a (substantially) circular surface of $R_{INT}$ of about 2.5 mm, and optical fibers (synthetic optical fibers for example) of 500 µm diameter having a numerical aperture of 0.5 (an angular acceptance of) 30°) are preferred. Furthermore, each collector (bundle) contains at least 70 fibers, even 75 optical fibers.

If the number of optical fibers is decreased, $R_{INT}$ may be decreased and a "sacrificial" ring may preferably be added in order to maintain crimping for a radial extent of about 2.5 mm.

The injection system according to the invention may comprise a (thin) optical guide, preferably directly at the exit of the jacket and then an illuminating device may comprise the injection system and a (thin) light-extracting medium. At least one injection ribbon preferably made of optical fibers (especially consisting of optical fibers), especially made up of one or two layers, and even a light-extracting medium comprising light-extracting optical fibers, is preferably used.

Even more preferably, the injection ribbon is made of optical fibers originating from the optical collector (which is a bundle) and the light-extracting medium indeed comprises these optical fibers which are then light extractors.

The injection ribbon made of optical fibers according to the invention may preferably have at least one of the following features:
- the injection ribbon comprises a single layer of optical fibers, said fibers being optically independent (little or no cross coupling), or two layers, for example in order to emit flux via two main faces of the extracting medium; and
- the injection ribbon has a thickness smaller than 5 mm and better still smaller than 1 mm, preferably corresponding to the diameter of the optical fibers.

The fibers of the injection ribbon (in a given layer) are typically regularly spaced, with a distance between them (center to center) preferably comprised between 0.3 mm and 2 mm and a separation distance (empty space between fibers) preferably between 0.15 mm and 2.2 mm.

Otherwise, in a preferred embodiment, the optical collector preferably comprises a bundle of optical fibers, said optical fibers having a diameter smaller than 1.5 mm, the optical fibers organizing at the exit of the jacket into at least one thin injection ribbon, especially of thickness smaller than 2 mm, opening onto a thin light-extracting medium of thickness smaller than 5 mm.

Of course, the source carrier (large enough for this purpose, preferably an LED PCB carrier) may bear a plurality of injection systems, such as the aforementioned, said systems being located side-by-side, preferably identical and leading to a plurality of injection ribbons (preferably made of optical fibers), (able to be) optically coupled to an edge face of a light-extracting medium. Furthermore, the number of injection systems, such as the aforementioned, may be increased or doubled by adding injection systems on an opposite edge of the extracting medium.

As the, preferably thin, light-extracting medium, a light-extracting element formed of a ribbon of optical fibers made extractive (sandblasting, laser, etc.) and/or a light-extracting transparent or semitransparent film, especially a film that scatters light in its bulk or its surface, is preferred.

A woven textile is a sheet, obtained by weaving or knitting, made up of directionally distributed fiber-based threads. The weaving is the result of the interlacing, in a given plane, of threads arranged in the warp direction (called warp threads below) and threads arranged perpendicularly to the warp threads, in the weft direction (called weft threads below). The binding obtained between these warp threads and these weft threads is called the weave. The binding threads ensure the satisfactory cohesion of the woven textile and, depending on their nature, their size and/or mechanical properties, determine the particular properties of the textile.

Now, light-emitting fabrics currently exist comprising a woven textile obtained by weaving threads, called binding threads, and optical fibers. The term "binding thread" encompasses all threads or fibers other than optical fibers, i.e. any thread or fiber not having the property of being able to emit light laterally, and therefore any thread or fiber not directly connected or connectable to the injection system.

A light-emitting fabric and its weaving method are for example described in document FR 2 859 737 or WO 2005/026423 and adhesive bonding to a rigid carrier in FR 2 907 194 or its arrangement on a rigid carrier in document FR 2 938 628 (all the examples) or in the aforementioned prior art WO 2007/003857 (FIGS. 1 and 2).

These known light-emitting fabrics preferably comprise woven textiles with;
  binding threads comprising synthetic polymer fibers of organic nature such as polyester or polyamide fibers; and
  optical fibers of organic nature.

More widely, the following may be chosen:
  binding threads comprising organic fibers of natural, animal or vegetable origin, such as silk, wool, cotton, flax or hemp;
  binding threads comprising organic fibers containing natural or synthetic polymers such as cellulose, polyamides, polyesters such as polyethylene terephthalate (PET) polybutylene terephthalate (PBT), polyvinyl chloride (PVC), polyolefins such as polypropylene (PP) and polyethylene (PE) and polyacrylics such as polymethyl methacrylate; and
  fiber blends.

Advantageously, the woven textile according to the invention may comprise binding threads containing mineral fibers, and especially comprises by weight relative to the weight of the woven textile at least 20%, at least 30%, at least 40%, at least 50%, at least 60%, at least 70%, at least 80%, or at least 90% of compound of mineral nature.

The optical fibers of the woven textile comprise invasive alterations, corresponding to notches or small slits, that allow light to be extracted from the fibers because they modify the angle of reflection of the light rays inside the fiber and the lateral transmission of the light to the exterior of the fiber. The optical fibers therefore make it possible both to convey light inside their structure but also to emit light laterally. Therefore, the optical fibers allow light to be guided and distributed inside the light-emitting fabric and the main surfaces of the light-emitting fabric to be illuminated diffusely.

The invasive alterations may be obtained in various ways and especially by abrading processes such as sandblasting or ablation by means of high-intensity light beams such as a laser beams. The invasive alterations may be produced in the optical fibers before or after weaving. The invasive alterations may be produced in only one surface portion of the fiber or on two opposite surface fractions of the fiber.

The woven textile may comprise two groups of optical fibers, one group abraded in a surface fraction oriented toward a first main face of the textile, the other group being abraded in a surface fraction oriented toward the opposite main face of the textile. These groups may preferably be in separate regions, adjacent regions or in a common region.

The, especially thin, light-extracting medium of the illuminating device according to the invention may therefore preferably be chosen from at least one of the following elements:
  optical fibers (preferably) of at least one injection ribbon made of optical fibers preferably originating from the collector, the surface of said optical fibers being abraded in order to scatter light, said fibers optionally at least partially in or on a transparent or semitransparent (for example translucent) material (or matrix), especially glass or plastic, said material preferably having a refractive index (at 550 nm) that differs by at least 0.05 or even 0.1 from the refractive index of the cladding of the optical fiber composed of a core encircled by a cladding;
  a light-emitting fabric including (preferably consisting of) a woven textile comprising optical fibers woven into a textile, said optical fibers (preferably) belonging to at least one injection ribbon made of optical fibers preferably originating from the collector, the surface of said optical fibers being abraded in order to scatter light, said fabric optionally being associated with a sheet of glass or plastic or being located between two glass sheets (preferably via lamination interlayers, for example made of polyvinyl butyral (PVB), ethylene vinyl acetate (EVA) or polyurethane, or even via a resin or any other bonding means etc.) or between two plastic sheets or even a glass sheet and a plastic sheet;
  at least one transparent or semitransparent sheet or film, especially made of glass and/or plastic, coupled (via its edge face) to an injection ribbon made of optical fibers, originating from the collector, said, preferably thin, film comprising means for scattering light.

The aforementioned extracting elements may of course be combined (juxtaposed or even superposed).

By way of preferred thin extracting media, mention may be made of light-emitting fabrics preferably produced in Lightex® technology especially by Brochier. The light-emitting fabric may be white, colored and patterned or unpatterned. The light-emitting fabric may be:
  uniform with a standard textile weave;
  decorative with a geometric or figurative pattern created in the woven textile (jacquard pattern) of by reworking a uniform textile;
  informative with a logo, a message, an identity or a sign.

The light-emitting fabric makes it possible to produce light over part or over all its surface. In particular, by way of light-extracting media (of the semitransparent or transparent film or sheet type) mention may also be made of:
  plastic film(s) and preferably ETFE (ethylene tetrafluoroethylene) or FEP (fluorinated ethylenepropylene) film(s) comprising means for scattering light;
  a glass sheet (preferably as inabsorbent as possible, for example made of clear or extra clear glass, etc.) of thickness smaller than 3 mm or even smaller than 1 mm, preferably a single glazing unit, said sheet(s) comprising means for scattering light.

Light is extracted (from the thin medium) optionally via an added and/or removable layer (making optical contact with a transparent material for example and/or with the optical fibers preferably belonging to the injection ribbon).

In particular, the semitransparent or transparent film or sheet comprises, as means for scattering light, a scattering layer deposited on one main face, for example a layer with a (typically polymer or mineral) matrix containing scattering elements (of refractive index different from the index of the matrix, for example by at least 0.1) that are conventionally (preferably mineral) particles.

Light is typically extracted (from the thin medium) via surface scattering (textured, abraded surface, etc) and/or by internal (laser) etching.

In particular, the semitransparent or transparent film or sheet may comprise, as means for scattering light, a textured, irregular or rough surface or internal etching. This is typically produced by (mechanical, etc.) abrasion or by a chemical etching.

The light-extracting medium may be made up of a number of layers. Provision may be made to assemble (laminate) one of the aforementioned elements, in particular laminated glass sheet, glass/plastic bilayer, optical fiber textile and glass sheet as described in patent application WO 2008/062141.

The light-extracting medium may be any shape (with corners, rounded, etc.).

Another example of a light-extracting medium is formed by a fibrous structure preferably chosen from at least one of the following elements (alone or in combination): a mat of especially glass or silica fibers or of (organic) synthetic or natural fibers or a woven, nonwoven or knitted textile. This fibrous structure may especially be applied to a main face of a glass or plastic sheet. Such an extracting medium is described in patent application WO 2012/098330, in particular in its examples and on page 12 to page 14. These nonwoven or woven textiles comprise mineral or organic, natural or synthetic fibers (or threads). These fibers may be chosen from:

mineral fibers such as glass or basalt fibers;
   organic fibers of natural, animal or vegetable origin, such as silk, wool, cotton, flax or hemp;
   organic fibers comprising natural or synthetic polymers such as cellulose, polyamides, polyesters such as polyethylene terephthalate (PET) and polybutylene terephthalate (PBT), polyvinyl chloride (PVC), polyolefins such as polypropylene (PP) and polyethylene (PE) and polyacrylics such as polymethyl methacrylate; and
   fiber blends.

Here, the nonwoven textile is a sheet made up of directionally or randomly distributed fibers that have not been woven (or even knitted) and the internal cohesion of which is ensured in various ways such as by mechanical, physical or chemical methods and/or by combining these various methods.

If the extracting medium is thicker than the injection ribbon—especially when it is not a fabric using optical fibers belonging to the injection ribbon—a thickness difference smaller than 5 mm and preferably smaller than 3 mm is preferred.

The injection ribbon preferably made of optical fibers may be:
   adhesively bonded to the edge (edge face) of the extracting medium, especially when it is not a fabric using optical fibers belonging to the injection ribbon;
   or better still, inserted into a transition medium of refractive index near or identical to that of the extracting medium (refractive index difference preferably less than 0.1 at 550 nm) and/or inserted into the extracting medium.

The distance between the end surface of the collector and the extracting medium is for example comprised between 5 and 15 cm.

The illuminating device may comprise a carrier preferably chosen from:
   a suspending system (hanger, etc.) from which the light-extracting medium is suspended;
   a scaffold (frame etc.) over which the light-extracting medium is hung; and
   a board (the term being used with a broad meaning and for example encompassing films and panels) to which the light-extracting medium is added, even fastened (preferably adhesively bonded).

The board may be:
   transparent, translucent, semitransparent, colored (preferably white), reflective, opaque (absorbent), fluorescent, and/or
   of preferably flat or even curved general shape,
   and/or flexible and preferably rigid,
   and/or thermally conductive or thermally insulating,
   and/or of any thickness.

Mention may in particular be made by way of boards (the term being used with a broad meaning) of:
   a plasterboard;
   a (flat or curved) metal element taking the form of a wall lining for example; and
   a living space element or an element integratable into a living space.

The present invention will be better understood on reading the detailed description below of nonlimiting example embodiments and by way of the appended drawings, in which:

FIG. 3 illustrates a detail view of FIG. 2;

FIG. 4 illustrates a partial longitudinal cross-sectional view through the optomechanical system of the first embodiment of the invention (without the light source on its carrier);

FIG. 5 is a top view of the optomechanical system (without the optical collector) of the first embodiment of the invention;

FIG. 12 illustrates a partial cross-sectional view through the optomechanical system of a fourth embodiment of the invention.

Figure 1:
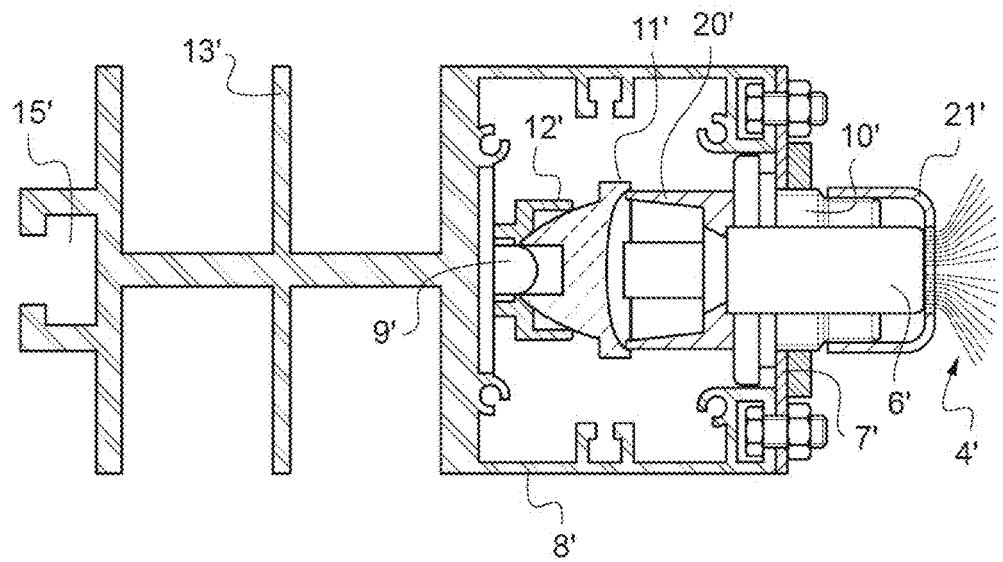
FIG. 1 illustrates a conventional optomechanical system for injecting light.
Figure 2:
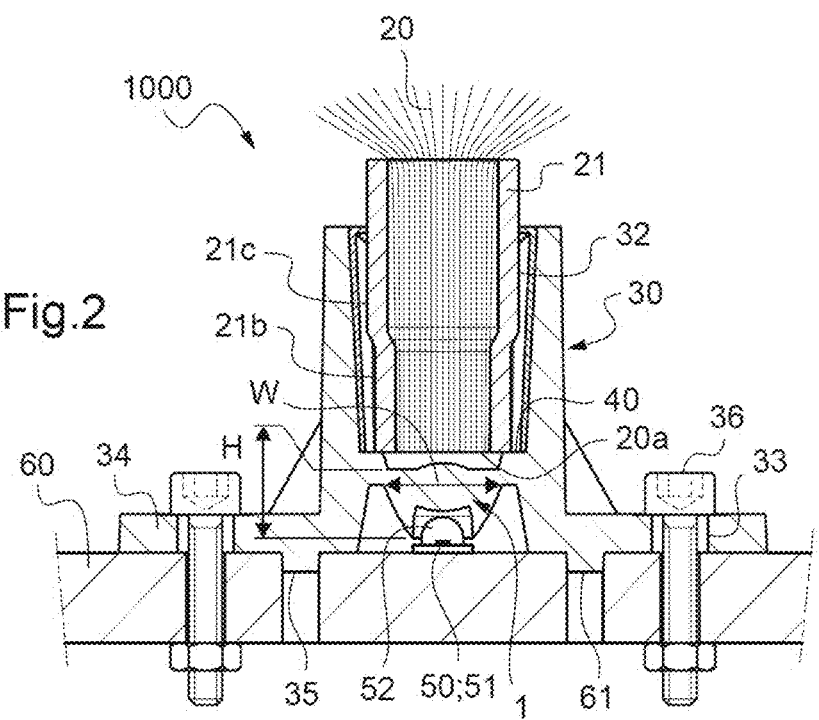
FIG. 2 illustrates a partial longitudinal cross-sectional view through an optomechanical system according to a first embodiment of the invention.

FIG. 2 (and FIG. 3 which is a detail view) illustrates a partial longitudinal cross-sectional view through an optomechanical system 1000, for a thin optical medium (preferably an injection ribbon coupled to a light-emitting fabric), according to a first embodiment of the invention, the system comprising an optical coupler 1 that comprises a transparent body made of PMMA (polymethyl methacrylate) of optical index n=1.5895 at 550 nm, which is obtained by molding, said coupler being axisymmetric and of central axis Oz, shown and clearly defined in a plane (O, X, Z) corresponding to the plane of the longitudinal cross section, O being the center of the entrance of the optical coupler 1.

FIG. 3 shows the outline of each surface of the optical coupler in the longitudinal cross-sectional plane and representative points are defined for each portion, only in the positive quadrant of the cross-sectional plane for the sake of clarity.

The optical coupler 1 comprises:

a lens 10 of central axis coincident with the axis Oz, here axisymmetric, and comprising:

a convex entrance face 11, defined by a central extent, on the axis Oz, called $h_e$, and of radial extent $R_1$, said face 11 having a peak E (0, $h_e$) and a circular end outline (external perimeter) passing through the end E1 ($R_1$, $z_{E1}$);

a convex central exit face 12, defined by a central extent, on the axis Oz, called H, and of radial extent $R_A$, said face 12 having a peak S (0, H) and a circular end outline (external perimeter) passing through the end A ($R_A$, $z_A$); and a peripheral exit face 13, joined to the central exit face 12, preferably without discontinuity, said face 13 preferably being flat (or, as a variant, frustratoconical or even concave) and set back from the central exit face, here this face 13 is an annular surface of circular end outline (external perimeter) passing through the end A1 and is furthermore defined by another characteristic point I, details of which are given below;

a cavity 10a, of axis of revolution coincident with the axis Oz, comprising:

a bottom 110 composed of the entrance face 11, here extended by a flat 11a forming an annular surface of circular end outline (the external perimeter) and also defined by an end E' ($R_E$, depth $h_{E'}$); and an entrance lateral surface 14, flared in the direction of the entrance of the coupler, comprising three frustroconical surface portions that are joined by their ends, the small diameter of one defining the large diameter of the other, said frustroconical surface portions having axes of revolution that are aligned on the axis Oz, the intersection of these three portions with the cross-sectional plane defining three linear segments in the positive quadrant of the cross-sectional plane;

the first segment 14a (the furthest removed from the axis Oz) is connected to the end E' of the flat (or as a variant, to the entrance central face E in the absence of a flat) and passes through the end C1 ($R_{C1}$, $z_{C1}$), which is therefore the closest to the entrance of the coupler for this first segment;

the second segment 14b is connected to the first segment 14a and preferably passes through an end point C2 ($R_{C2}$, $z_{C2}$), the closest to the entrance of the coupler for this second segment, the second segment 14b preferably being longer than the first segment;

and here the third segment 14c, which is shorter than the others, terminates on the axis X which passes through the end C($R_C$, 0); and a peripheral reflective surface 15, encircling the lens and the cavity, of axis of revolution coincident with the axis Oz, able to totally internally reflect rays, called oblique rays, refracted by the entrance lateral surface 14, said peripheral reflective surface 15 extending beyond the entrance face 11 in the direction of the exit of the optical coupler, from its lowest end C as far as its highest end D ($R_D$, $z_D$).

The injection system 1000 also comprises an optical collector 20 of central axis coincident with the axis Oz, here axisymmetric (but as a variant it could be substantially oval or hexagonal) and of millimeter-size radial extent $R_{INT}$, said optical collector 20 comprising:

optical fibers 20 defined by a given numerical aperture NA here equal to 0.5 and defining a collecting surface 20a;

and comprising a jacket 21, taking the form of a metal ring, details of which will be given below, having a given end surface 21a, the central exit face and the peripheral exit face being spaced apart from the collecting surface 20a, the central distance $e_F$ on the axis Oz between the optical collector 20 and the central exit face 12 being nonzero and smaller than 0.6 mm.

The dimensions of the design of the optical coupler 1 preferably meet constraints related to the plastic injection molding step: entrance angle β>2° for the demolding. The minimum draft is preferably three degrees for the walls.

The optomechanical system 1000 furthermore comprises a stop surface 40 against which the end surface 21a abuts.

The stop surface 40 is here joined to the peripheral exit face 13, opposite the central exit face. The jacket 21a is in abutment over a width BB' larger than 0.4 mm.

The stop surface 40 is flat and axisymmetric, annular or as a variant frustroconical (flared in the direction of the exit of the system).

Here more precisely, the transparent body (therefore the coupler 1) comprises an axisymmetric ramp 16 that here is frustroconical and flared in the direction of the exit of the system (or as a variant it could have any other type of symmetry about the axis Oz) preferably such that the exit angle β'≥20° in order to meet demolding constraints.

In the positive quadrant, the following are worth noting:

the internal edge B of the stop surface 40;

the edge F of the end surface 21a of radial extent $R_{INT}$, in other words, the external edge of the collecting surface 20a;

the external edge B' of the stop surface 40 (making contact with the external outline of the end surface 21a); and the representative point M ($R_M$, $h_e$) on the ramp 16 and of the same extent in Z as S.

As a variant, it would be tolerable for the end outline A1 of the peripheral exit face (not to be circular, likewise for B) in order to prevent light rays refracted in this extreme zone from entering into the collector or even to prevent this extreme zone from receiving few or any light rays.

Thus, the zone between M and B, which here is frustroconical, and even between A1 and M, may in particular in fact be any shape (but preferably remains demoldable).

The end surface 21a of the jacket 21 preferably extends beyond the stop surface 40. Here the end surface 21a apertures (therefore masks) the outermost fraction of the peripheral exit face 13, between I (which faces F) and A1, here 0.4 mm in width.

Thus, the zone between I and A1 may as a variant in particular be any shape (but preferably remains demoldable) that does not reinject parasitic light rays into the collector (i.e. light rays that are not collimated enough or that are a source of spatial nonuniformity).

The injection system 1000 also comprises a member 30 for aligning the optical collector 20 with the optical coupler 1, here integrally formed with the optical coupler 1 (one part) and described below.

The following table collates the coordinates of noteworthy points of the coupler, of the aligning member and of the stop surface.

|  | X (mm) | Z (mm) |
|---|---|---|
| Entrance | | |
| LED | 0 | −0.24 |
| E | 0 | 1.41 |
| E1 | 1.33 | 1.63 |
| E' | 1.40 | 1.63 |
| C | 1.58 | 0.00 |
| C1 | 1.53 | 1.13 |
| C2 | 1.56 | 0.17 |
| D | 3.11 | 2.73 |
| Exit | | |
| S | 0 | 3.86 |
| I | 2.50 | 3.53 |
| A | 1.37 | 3.53 |
| A1 | 2.90 | 3.53 |
| B | 3.07 | 4.43 |
| M | 3.00 | 3.86 |

Namely, with a tolerance of ±100 μm related to the plastic injection molding process:

|  | X (mm) | Z (mm) |
|---|---|---|
| Entrance | | |
| LED | 0 | −0.2 |
| E | 0 | 1.4 |
| E1 | 1.3 | 1.6 |
| E' | 1.4 | 1.6 |
| C | 1.6 | 0.0 |
| C1 | 1.5 | 1.1 |
| C2 | 1.6 | 0.2 |
| D | 3.1 | 2.7 |
| Exit | | |
| S | 0 | 3.9 |
| I | 2.5 | 3.5 |
| A | 1.4 | 3.5 |
| A1 | 2.9 | 3.5 |
| B | 3.1 | 4.4 |
| M | 3.0 | 3.9 |

The following table summarizes key optimal parameters of the system 1000 (in mm):

| H | 3.9 |
|---|---|
| W (2$R_D$) | 6.2 |
| $e_i$ | 0.2 |
| $e_f$ | 0.6 |
| $R_{INT}$ | 2.5 |
| $R_{A1}$ | 2.1 |
| $R_A$ | 1.4 |
| $R'_1$ | 0.1 |
| $R_1$ | 1.3 |
| $R_B$ | 1.5 |
| $R_C$ | 1.6 |
| Height of the ramp 16 | 0.9 |
| BB' | 1.07 |

The equation of the surface of the entrance face 11 is written:

$$z(r) = \frac{r^2}{R\left(1 + \sqrt{1 - (1+k)\frac{r^2}{R^2}}\right)} + A_4 r^4 + A_6 r^6 + A_8 r^8 + \ldots$$

The optimal coefficients are defined in the following table:

| Convex entrance face | | | | | |
|---|---|---|---|---|---|
| | conical constant (k) | R (mm) | $A_4$ | $A_6$ | $A_8$ |
| Aspheric coefficients | 0 | 4.50 | 0.01 | −0.001 | 0 |

The equation of the surface of the exit central face 12 is written:

$$z(r) = \frac{r^2}{R\left(1 + \sqrt{1 - (1+k)\frac{r^2}{R^2}}\right)} + A_4 r^4 + A_6 r^6 + A_8 r^8 + \ldots$$

The optimal coefficients are defined in the following table:

| Exit central face | | | | | |
|---|---|---|---|---|---|
| | conical constant (k) | R in mm | $A_4$ | $A_6$ | $A_8$ |
| Aspheric coefficients | 0 | 3.00 | 0 | 0 | 0 |

The peripheral reflective surface 15 gets further away from the entrance lateral surface 14 and from the entrance face 11 in the direction of the exit of the coupler 1. It is preferably of maximum extent $z_D$ along Oz smaller than the extent $z_A$ of the central exit face 12 or of the extent $Z_i$ and/or $Z_{A1}$. It is larger than H/2. The minimum distance $h_m$, called the material entrance distance, between said peripheral reflective surface 15 and the peripheral exit face 13 is larger than 0.8 mm, here the distance between D and A1. The equation of the peripheral reflective surface 15 is written:

$$z(r) = \frac{r^2}{R\left(1 + \sqrt{1 - (1+k)\frac{r^2}{R^2}}\right)} + A_4 r^4 + A_6 r^6 + A_8 r^8 + \ldots$$

The optimal coefficients are defined in the following table:

| Peripheral reflective surface | | | | | |
|---|---|---|---|---|---|
| | conical constant (k) | Radial extent (R in mm) | $A_4$ | $A_6$ | $A_8$ |
| Aspheric coefficients | −1 | 1.25 | −0.00569 | 0.0001373 | 0.00002663 |

The light source 50 is a light-emitting diode providing a Lambertian emission (in the far field) and having a square emissive zone 51 of width L equal to 1 mm, said diode being centered on the axis Oz and surmounted with dome-shaped primary optics 52, fastened (source via a base 53) to the main face of a carrier 60 that is a printed circuit board that is preferably made of metal in order to promote thermal dissipation of heat via thermal conduction.

This is for example the Luxeon Rebel ES (ref. LXW8-PW35) from Philips Lumileds, the nominal light flux of which at 25° and 350 mA is 114 lm for a color temperature of 3500 K. The distance between the dome 52 and E is 170 µm, and the distance between the dome and C is about 300 µm. The dome is very largely inserted into the cavity 10*a* so that the optical coupler can recover a maximum of light rays.

The entrance face 11 and the central exit face 12 are able to orient or to maintain light rays, called central light rays, that are refracted by the entrance face and the central exit face, toward or in the numerical aperture NA.

The peripheral reflective surface 15 and the peripheral exit face 13 are able to orient or to maintain light rays, called oblique light rays, that are refracted by the entrance lateral surface, toward or in the numerical aperture NA. The end D is as high as possible in order to recover the rays as best as possible.

Figure 6:
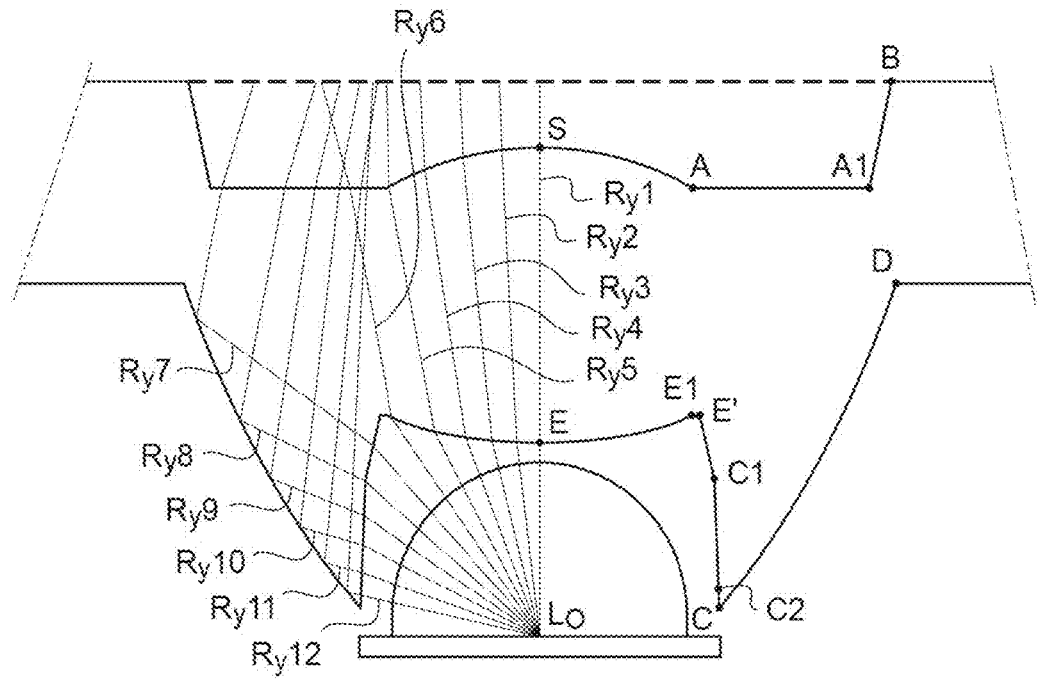
FIG. 6 illustrates the centered point response of the optical coupler based on twelve light rays spaced apart by 7° and emitted from a centered point source.

FIG. 6 illustrates the centered point response of the optical coupler based on twelve light rays every 7° originating from the LED, obtained by simulating the optical system with the software package LightTools from Synopsis.

The properties of the central and lateral rays are indicated in the following table:

| Central rays | | Angle of attack relative to Z (°) | | |
|---|---|---|---|---|
| Reference | Angle of injection relative to Z (°) | Bottom of the entrance cavity | Central exit face | Peripheral exit face |
| Ry1 | 0 | 0.000 | 0.000 | — |
| Ry2 | 7 | 3.419 | 1.496 | — |
| Ry3 | 14 | 6.633 | 2.659 | — |
| Ry4 | 21 | 9.365 | 3.014 | — |
| Ry5 | 28 | 11.125 | 1.630 | — |
| Ry6 | 35 | 10.809 | — | 17.343 |

| Lateral rays | | Angle of attack relative to Z (°) | | |
|---|---|---|---|---|
| Reference | Angle of injection relative to Z (°) | Entrance lateral surface | Peripheral reflective surface | Peripheral exit face |
| Ry7 | 42 | 55.188 | 10.857 | 17.421 |
| Ry8 | 49 | 64.777 | 10.705 | 17.172 |
| Ry9 | 56 | 68.619 | 8.432 | 13.479 |
| Ry10 | 63 | 72.669 | 6.893 | 10.998 |
| Ry11 | 70 | 76.874 | 5.677 | 9.046 |
| Ry12 | 77 | 79.231 | 2.642 | 4.201 |

It will in particular be noted that the ray Ry6, refracted by the flat 11*a* then from the peripheral exit face 13, is deflected from the axis Z and arrives at the surface 20*a* of the optical collector at the same point as the ray Ry8 that, in contrast, is an oblique ray that is deflected toward the axis Z. Moreover, the ray Ry7 is one of the last oblique rays entering into the optical collector 20. This mixing affects the spatial uniformity of the light flux injected into the collector.

Figure 7:
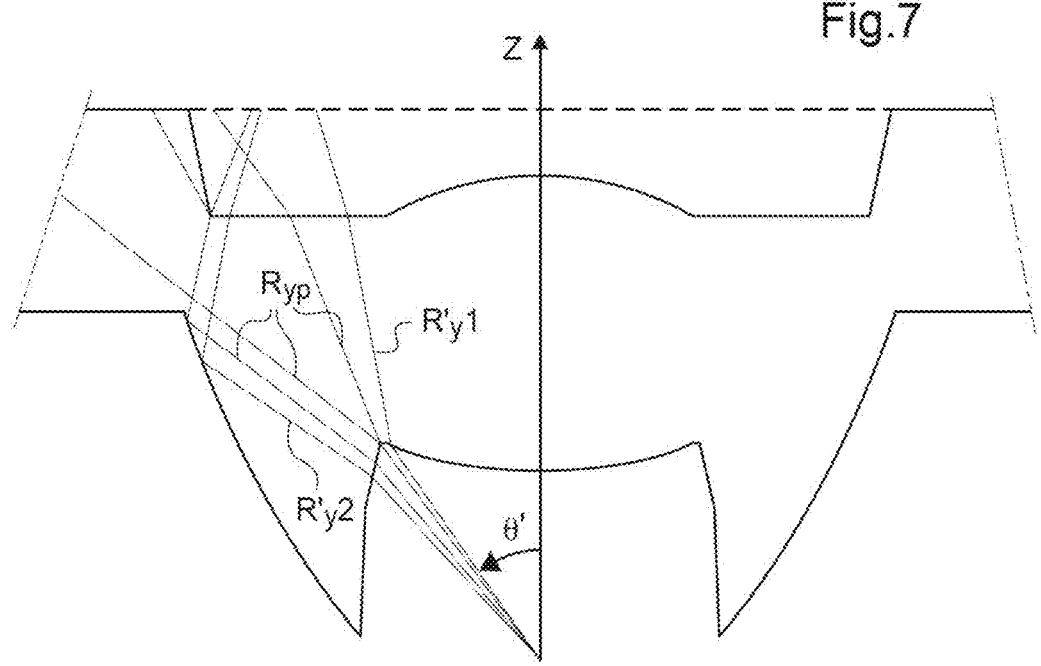
FIG. 7 shows the path of a few representative light rays originating from a centered point source.

FIG. 7 shows the path of a few representative lateral light rays originating from a centered point source Lo.

Ry'1, emitted at an angle θ', is received by the collector 20. Ry'2 is also received by the collector 20. Three intermediate lost rays Ryp are also shown, these rays passing into the flank of the body 1 or arriving at the jacket 21 projecting from the collector 20.

Figure 8:
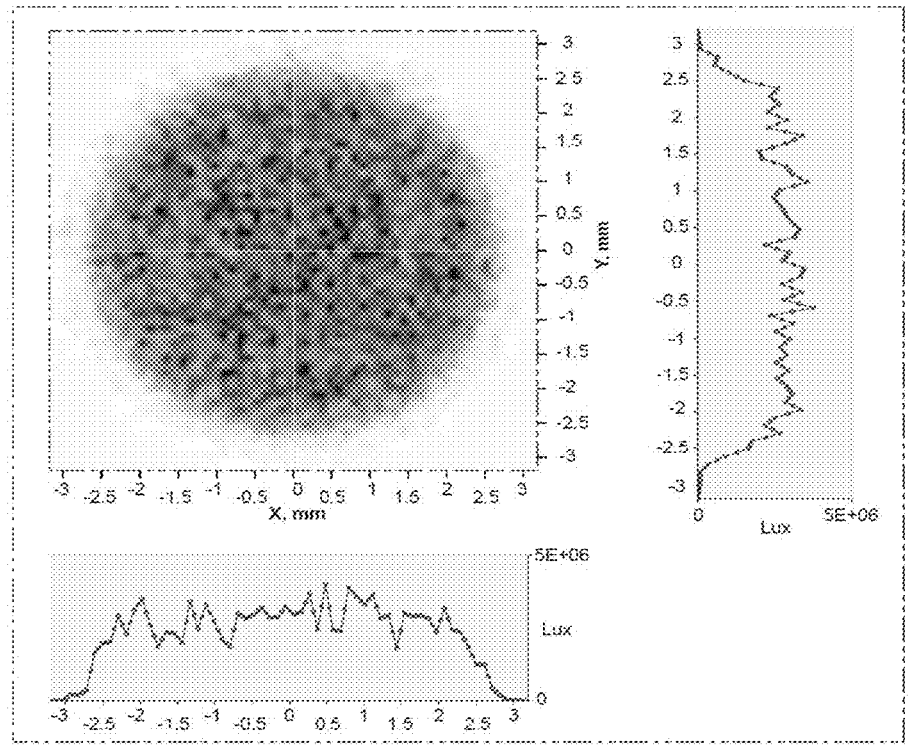
FIG. 8 shows a map of illumination at the collecting surface of the collector, and two orthogonal cross sections through the illumination map.

FIG. 8 shows the illumination map (illumination in lux) as a function of the radial position (in mm), said map being simulated at the collecting surface 20 here of radius $R_{INT}$ equal to 2.5 mm with optical fibers of 500 µm diameter, and also shows two orthogonal cross sections through the illumination map. FIG. 8 is obtained with the software package LightTools.

The illumination is uniform over all of the collecting surface. The few peaks observed have a spatial dimension that is so small relative to the size of the core of the optical fibers that they average out on the scale of the diameter of the fiber.

The optical alignment and fastening of the parts 1, 20 are now described using FIGS. 2 to 5. The aligning member 30 comprises a cylindrical sleeve of entrance diameter P, lateral to the stop surface 40, that widens in the direction of the exit and comprising three clamping ribs at 120° 31*a*, 31*b*, 31*c*. The jacket 21 of the collector is crimped (constricted) 21*b* over a first length not making contact with the internal wall 31*a* of the sleeve 30, then the jacket widens 21*c* ($R'_{INT} < R_{INT}$) next defining a clamping height over which local contact is made with the internal wall of the sleeve 32, and emerges from the sleeve especially in order to facilitate its fitting/demounting.

The body of the optical coupler, which extends beyond the optical coupler and therefore beyond its optically functional zone, rests on the PCB source carrier 6, 61, via bearing surfaces 34 taking the form of two fins on either side of the lens, the internal faces of which protrude relative to the cavity 10*a* and are spaced apart from the peripheral reflective surface 15. These fin 34 comprise two tenons 35 for self-centering on the PCB 6, 61 and knockouts 33 (further from the lens then the tenons 35) for nut 36 and bolt fastening to the PCB 6. Four reinforcing ribs 37 are added between the sleeve 30 and the fins 34.

The collector 20, 21 is defined by the dimensions specified in the following table (inside diameter and outside diameter with the jacket 21).

| | Inside diameter (mm) | Outside diameter (mm) |
|---|---|---|
| Non-crimped zone | 5.85 | 8 |
| Crimped zone | 5 | 7.15 |

Optical measurements are carried out in the location of the collecting surface using an integrating sphere.

An LED is used, namely the Luxeon Rebel ES (ref. LXW8-PW35) from Philips Lumileds, the nominal light flux of which at 25° C. and 350 mA is 114 lm for a color temperature of 3500 K. With the coupler 1' a flux of 61 lm is obtained at the collecting surface, i.e. an excellent efficacy is obtained. The collector is a bundle of optical fibers of 500 µm diameter and 75 in number that organize as they exit the jacket into an injection ribbon of optical fibers, here forming a layer. $R_{INT}$ preferably ranges from 2.2 mm to 2.5 mm. In the injection ribbon the center-to-center distance between two neighboring optical fibers is for example 0.67 mm. The empty space between two neighboring optical fibers is for example 0.18 mm.

The injection ribbon (at the exit of the jacket 21) opens onto the thin light-extracting medium (not shown) that is here a light-emitting fabric (here a white, patternless fabric) that comprises a woven textile formed by the optical fibers of the injection ribbon woven into a textile made of 167 dtex polyester (24%) and PMMA (76%) fibers, the external surface of said optical fibers being abraded, in order to scatter the light, and woven into a textile.

The chosen extracting surface has an optical-fiber density of 15 fibers/cm and is rectangular (29.7 cm×10 cm) and 0.5 mm in thickness. It is a question of the white Lightex® product from Brochier Technologies.

More precisely, the injection system 1000 is duplicated on the two opposite lateral edges of the extracting surface by placing thus two systems on each edge. The light-emitting fabric is arranged on a (BA13) plasterboard (preferably) on the white side. The luminance measured is about 1400 Cd/m².

Moreover, the spatial uniformity of the luminance is excellent because the luminance variation coefficient, given by the formula $\sigma_L/\langle L \rangle$, where $\sigma_L$ is the standard deviation of the luminance normal to the board and $\langle L \rangle$ the average luminance normal to the board, is lower than 20%. This luminance variation coefficient is calculated from luminance photographs of an elementary surface of 1 cm² taken with a goniophotometer such as the Lumicam device from Instrument Systems, said photographs being repeated over the entire area of the textile.

Alternatively (or cumulatively) the injection ribbon of optical fibers may the adhesively bonded to or preferably inserted into a transparent (white or optionally tinted) film, especially made of glass and/or plastic (polymethyl methacrylate (PMMA), polycarbonate (PC) or polyurethane (PU)), coupled to the injection ribbon and comprising means for scattering light.

Figure 9:
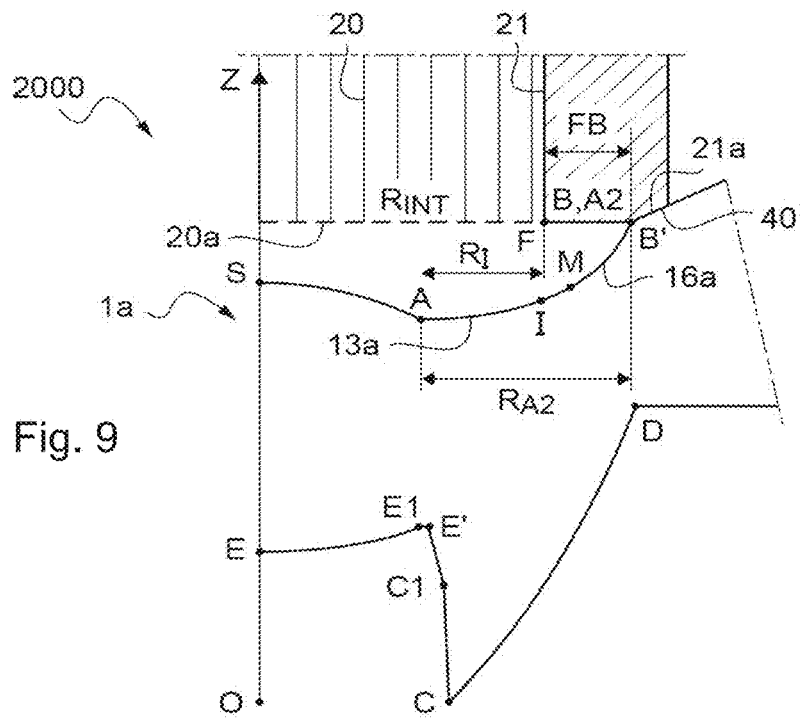
FIG. 9 illustrates a partial longitudinal cross-sectional view through an optical coupler of an optomechanical system according to a second embodiment of the invention.

FIG. 9 illustrates a partial longitudinal cross-sectional view of an optical coupler 1a of an opto mechanical system 2000 according to a second embodiment of the invention, differing above all by the concave shape of the peripheral exit face 13a that is joined to the central exit face and extends (without discontinuity) thus as far as the stop formed by internal edge B. The point M is preferably arranged under the jacket of the collector and the point I is preferably set back relative to the point S.

In this embodiment the peripheral exit face 13a is also considered to comprise a part 16a between M and A2 leading as far as the stop surface (edge B merged with A2).

Moreover, the jacket 21 of the collector has a (beveled) frustoconical outside edge 21a bearing against the stop surface 40 that is here frustoconical.

Figure 10:
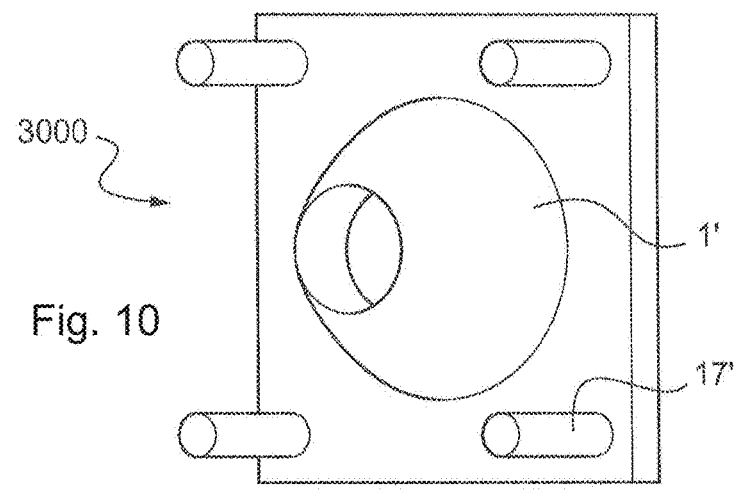
FIG. 10 illustrates a view of the entrance of an optical coupler of an optomechanical system according to a third embodiment of the invention.

FIG. 10 illustrates a schematic view of the entrance of an optical coupler of an optomechanical system 3000 according to a third embodiment of the invention in which the aligning member 30' and the optical coupler 1' are two separate parts.

Figure 11:
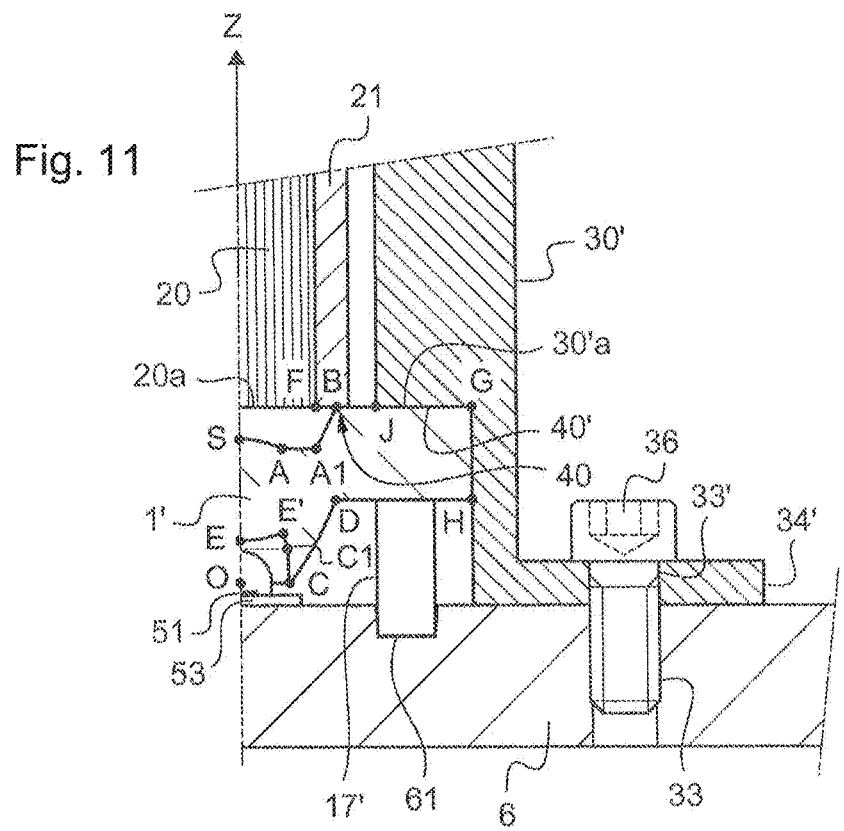
FIG. 11 illustrates a partial cross-sectional view through the optomechanical system of the third embodiment the invention.

FIG. 11 illustrates a (partial) longitudinal cross-sectional view of the optomechanical system 3000 of the third embodiment of the invention.

The optical coupler 1' is equipped with four feet 17' for the self-centering, said feet optionally being force-fitted, by virtue of their conical shape, into the PCB source carrier 60 that is drilled for this purpose (through- or blind holes 61).

The aligning member 30' rests on a lateral extension 40' of the coupler 1' in the vicinity of the stop surface 40, said extension being located between the points J and G. The coupler 1' has a straight or oblique flank GH. The aligning member 30' extends along the flank (against it or spaced apart therefrom) as far as the PCB board 6 and then comprises one or more fins 34' equipped with knockouts 33' for fastening (by screw 36, etc.) to the PCB 6. The aligning member 30' also blocks the pre-positioned optical coupler 1'.

FIG. 12 illustrates a partial schematic cross-sectional view of the optomechanical system 4000 according to a fourth embodiment of the invention in which the aligning member 30" and the optical coupler 1" are two separate parts.

The ramp 16' from A1 to the edge B of the stop surface 40 belongs to the aligning member 30", Beyond A1 the coupler is extended in the form of a lobe. The peripheral exit face 13 is extended by a bearing surface 19 for the aligning member.

To fit it, the beveled edge (flank GH) of the lens slides over a smooth rib of the aligning member before lodging in its housing.

The aligning member 30' extends as far as the PCB board 6 via one or more fins 34' equipped with:
a tenon-type self-centering system 35'; and
knockouts (not shown) for fastening (by screw) to the PCB 6.

The invention claimed is:

1. An optomechanical system for injecting light into an optical medium, the optomechanical system comprising:
an optical coupler that comprises a body of axis Oz, O being a center of an entrance of the optical coupler, including integrally formed:
a lens of axis coincident with the axis Oz, of maximum width W, the lens comprising:
a convex entrance face of radial extent R1;
a convex central exit face, defined by a central extent H, on the axis Oz, and of radial extent RA; and
a peripheral exit face that comprises a part joined to the central exit face, said part being flat or concave or frustoconical and flared in the direction of an exit of the optomechanical system;
a cavity, of axis coincident with the axis Oz, comprising a bottom containing the convex entrance face, and comprising an entrance lateral surface;
a peripheral reflective surface, encircling the lens and the cavity, of axis coincident with the axis Oz, able to totally internally reflect light rays refracted by the entrance lateral surface, said peripheral reflective surface extending beyond the convex entrance face in a direction of the exit of the optical coupler;
an optical collector of axis coincident with the axis Oz, with a collecting surface, facing the convex central exit face, of millimeter-size radial extent $R_{INT}$, and a numerical aperture NA smaller than 1, the optical collector comprising a jacket having an end surface, the convex central exit face and the peripheral exit face being spaced apart from the collecting surface, the optical collector comprising a bundle of optical fibers, said optical fibers having a diameter smaller than 1.5 mm; and
an aligning member for aligning the optical collector with the optical coupler, the optical coupler and the aligning member being integrally formed or being indirectly or directly fastened together,
a central distance eF on the axis Oz between the collecting surface and the convex central exit face being nonzero and smaller than 5 mm,
and the optomechanical system comprising a stop surface against which the end surface abuts,
wherein the end surface of the jacket extends toward the axis Oz beyond the stop surface, and the end surface is facing the peripheral exit face.

2. The optomechanical system as claimed in claim 1, wherein the bottom of the cavity, the convex central exit face and the peripheral exit face are such that light rays refracted by the bottom of the cavity and originating from a point on the axis Oz are refracted by the peripheral exit face, and wherein the optical coupler is such that light rays, originating from a point on the axis Oz, first refracted by the entrance lateral surface then on the peripheral reflective surface meet at the collecting surface in a zone common to light rays originating from a point on the axis Oz and first refracted by the bottom of the cavity.

3. The optomechanical system as claimed in claim 1, wherein $R_{INT}$ is smaller than 3.0 mm.

4. The optomechanical system as claimed in claim 3, wherein $R_{INT}$ is larger than or equal to 1.5 mm.

5. The optomechanical system as claimed in claim 1, wherein the optical coupler is defined by the following dimensions:
$1.88 R_{INT} < W < 3.1 R_{INT}$;
$0.4 R_{INT} < R_1 < 0.66 R_{INT}$; and
$0.41 R_{INT} < R_A < 0.68 R_{INT}$.

6. The optomechanical system as claimed in claim 1, wherein the optical coupler is defined by the following dimensions:
W smaller than 10 mm;
H smaller than W;
RA larger than 1.2 mm and smaller than 1.6 mm;
R1 larger than 1.2 mm and smaller than 1.6 mm; and
hE', maximum depth of the bottom larger than 1.4 mm and smaller than 1.8 mm.

7. The optomechanical system as claimed in claim 6, wherein H is larger than 3.6 mm.

8. The optomechanical system as claimed in claim 1, wherein the peripheral reflective surface gets further away from the entrance lateral surface and from the convex entrance face in the direction of the exit of the optical coupler.

9. The optomechanical system as claimed in claim 1, wherein on at least one surface portion closest to the bottom of the cavity, the entrance lateral surface is frustroconical and flared in the direction of the entrance of the optical coupler.

10. The optomechanical system as claimed in claim 1, wherein the aligning member houses the optical collector, and wherein the body and/or the aligning member incorporates the stop surface.

11. The optomechanical system as claimed in claim 1, further comprising a light source, centered on the axis Oz, said light source being placed on a source carrier, and wherein the optical coupler rests on the source carrier, via one or more bearing surfaces of the optical coupler, said one or more bearing surfaces being spaced apart from the peripheral reflective surface or wherein the optical coupler is assembled in the aligning member, which rests on the source carrier via one or more bearing areas, said one or more bearing areas being spaced apart from the peripheral reflective surface.

12. The optomechanical system as claimed in claim 1, further comprising a light source placed on a source carrier and wherein the optical coupler is securely fastened to the source carrier, or wherein the optical coupler is assembled in the aligning member, the aligning member resting on the source carrier and being securely fastened to the source carrier.

13. An assembly comprising the optical coupler and the aligning member of the optomechanical system as claimed claim 1, which are securely fastened, the body or the aligning member incorporating the stop surface against which the optical collector is able to bear.

14. An optical coupler of the opto mechanical system as claimed in claim 1, and incorporating the stop surface against which the optical collector is able to bear.

15. The optomechanical system as claimed in claim 1, wherein the width W is of subcentimeter-size.

16. The optomechanical system as claimed in claim 1, wherein H is smaller than W.

17. An optomechanical system for injecting light into an optical medium, the optomechanical system comprising:
an optical coupler that comprises a body of axis Oz, O being a center of an entrance of the optical coupler, including integrally formed:
a lens of axis coincident with the axis Oz, of maximum width W, the lens comprising:
a convex entrance face of radial extent R1;
a convex central exit face, defined by a central extent H, on the axis Oz, and of radial extent RA; and
a peripheral exit face that comprises a part joined to the central exit face, said part being flat or concave or frustroconical and flared in the direction of an exit of the optomechanical system;
a cavity, of axis coincident with the axis Oz, comprising a bottom containing the convex entrance face, and comprising an entrance lateral surface;
a peripheral reflective surface, encircling the lens and the cavity, of axis coincident with the axis Oz, able to totally internally reflect light rays refracted by the entrance lateral surface, said peripheral reflective surface extending beyond the convex entrance face in a direction of the exit of the optical coupler;
an optical collector of axis coincident with the axis Oz, with a collecting surface, facing the convex central exit face, of millimeter-size radial extent $R_{INT}$, and a numerical aperture NA smaller than 1, the optical collector comprising a jacket having an end surface, the convex central exit face and the peripheral exit face being spaced apart from the collecting surface, the optical collector comprising a bundle of optical fibers, said optical fibers having a diameter smaller than 1.5 mm; and
an aligning member for aligning the optical collector with the optical coupler, the optical coupler and the aligning member being integrally formed or being indirectly or directly fastened together,
a central distance eF on the axis Oz between the collecting surface and the convex central exit face being nonzero and smaller than 5 mm,
and the optomechanical system comprising a stop surface against which the end surface abuts,
wherein the stop surface is frustroconical and the end surface has a complementary shape to the stop surface.

18. An optomechanical system for injecting light into an optical medium, the optomechanical system comprising:
an optical coupler that comprises a body of axis Oz, O being a center of an entrance of the optical coupler, including integrally formed:
a lens of axis coincident with the axis Oz, of maximum width W, the lens comprising:
a convex entrance face of radial extent R1;
a convex central exit face, defined by a central extent H, on the axis Oz, and of radial extent RA; and
a peripheral exit face that comprises a part joined to the central exit face, said part being flat or concave or frustroconical and flared in the direction of an exit of the optomechanical system;

a cavity, of axis coincident with the axis Oz, comprising a bottom containing the convex entrance face, and comprising an entrance lateral surface;

a peripheral reflective surface, encircling the lens and the cavity, of axis coincident with the axis Oz, able to totally internally reflect light rays refracted by the entrance lateral surface, said peripheral reflective surface extending beyond the convex entrance face in a direction of the exit of the optical coupler;

an optical collector of axis coincident with the axis Oz, with a collecting surface, facing the convex central exit face, of millimeter-size radial extent $R_{INT}$, and a numerical aperture NA smaller than 1, the optical collector comprising a jacket having an end surface, the convex central exit face and the peripheral exit face being spaced apart from the collecting surface, the optical collector comprising a bundle of optical fibers, said optical fibers having a diameter smaller than 1.5 mm; and an aligning member for aligning the optical collector with the optical coupler, the optical coupler and the aligning member being integrally formed or being indirectly or directly fastened together, a central distance eF on the axis Oz between the collecting surface and the convex central exit face being nonzero and smaller than 5 mm, and the optomechanical system comprising a stop surface against which the end surface abuts, wherein the optical fibers organize on exiting the jacket into at least one thin injection ribbon, of thickness smaller than 2 mm.

19. The optomechanical system as claimed in claim 18, wherein the thin light-extracting medium has a thickness smaller than 5 mm.

20. An optomechanical system for injecting light into an optical medium, the optomechanical system comprising:

an optical coupler that comprises a body extending along an axis Oz, the optical coupler including:

a lens of axis coincident with the axis Oz, the lens comprising:

a convex entrance face;

a convex central exit face; and a peripheral exit face that comprises a part joined to the central exit face;

a cavity, of axis coincident with the axis Oz, comprising a bottom containing the convex entrance face, and comprising an entrance lateral surface;

a peripheral reflective surface, encircling the lens and the cavity, of axis coincident with the axis Oz, able to totally internally reflect light rays refracted by the entrance lateral surface, said peripheral reflective surface extending beyond the convex entrance face in a direction of the exit of the optical coupler;

an optical collector of axis coincident with the axis Oz, with a collecting surface, facing the convex central exit face, the optical collector comprising a jacket having an end surface, the convex central exit face and the peripheral exit face being spaced apart from the collecting surface, the optical collector comprising a bundle of optical fibers; and an aligning member for aligning the optical collector with the optical coupler, the optical coupler and the aligning member being integrally formed or being indirectly or directly fastened together, a central distance on the axis Oz between the collecting surface and the convex central exit face being nonzero and smaller than 5 mm, and the optomechanical system comprising a stop surface against which the end surface abuts, wherein the end surface of the jacket extends toward the axis Oz beyond the stop surface and the end surface is facing the peripheral exit face.

21. The optomechanical system as claimed in claim 20, wherein the bottom of the cavity, the convex central exit face and the peripheral exit face are such that light rays refracted by the bottom of the cavity and originating from a point on the axis Oz are refracted by the peripheral exit face, and wherein the optical coupler is such that light rays, originating from a point on the axis Oz, first refracted by the entrance lateral surface then on the peripheral reflective surface meet at the collecting surface in a zone common to light rays originating from a point on the axis Oz and first refracted by the bottom of the cavity.

22. The optomechanical system as claimed in claim 20, wherein the stop surface is frustroconical and the end surface has a complementary shape to the stop surface.

23. The optomechanical system as claimed in claim 20, wherein the peripheral reflective surface gets further away from the entrance lateral surface and from the convex entrance face in the direction of the exit of the optical coupler.

24. The optomechanical system as claimed in claim 20, wherein on at least one surface portion closest to the bottom of the cavity, the entrance lateral surface is frustroconical and flared in the direction of the entrance of the optical coupler.

25. The optomechanical system as claimed in claim 20, wherein the aligning member houses the optical collector, and wherein the body and/or the aligning member incorporates the stop surface.

* * * * *